United States Patent
Åström et al.

(10) Patent No.: US 11,234,200 B2
(45) Date of Patent: Jan. 25, 2022

(54) RADIO SYNCHRONIZATION TECHNIQUE

(71) Applicant: Telefonaktiebolaget LM Ericsson (publ), Stockholm (SE)

(72) Inventors: Magnus Åström, Lund (SE); Johan Bergman, Stockholm (SE); Andreas Höglund, Solna (SE); Xingqin Lin, Santa Clara, CA (US); Anders Wallén, Ystad (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 23 days.

(21) Appl. No.: 16/647,666

(22) PCT Filed: Sep. 25, 2018

(86) PCT No.: PCT/EP2018/076023
§ 371 (c)(1),
(2) Date: Mar. 16, 2020

(87) PCT Pub. No.: WO2019/063569
PCT Pub. Date: Apr. 4, 2019

(65) Prior Publication Data
US 2020/0267670 A1    Aug. 20, 2020

Related U.S. Application Data

(60) Provisional application No. 62/564,704, filed on Sep. 28, 2017.

(51) Int. Cl.
*H04W 56/00* (2009.01)
*H04W 48/10* (2009.01)

(52) U.S. Cl.
CPC ......... *H04W 56/001* (2013.01); *H04W 48/10* (2013.01)

(58) Field of Classification Search
None
See application file for complete search history.

(56) References Cited

U.S. PATENT DOCUMENTS

2015/0341164 A1* 11/2015 Ratnakar ............. H04L 27/2607
                                                          375/362
2016/0316431 A1* 10/2016 Zhu ..................... H04W 52/0216
(Continued)

FOREIGN PATENT DOCUMENTS

WO    2018175760 A1    9/2018

OTHER PUBLICATIONS

Ericsson et al., "New WID on Even Further Enhanced MTC for LTE", 3GPP TSG RAN Meeting #75, Dubrovnik, Croatia, Mar. 6, 2017, pp. 1-4, RP-170732, 3GPP.
(Continued)

*Primary Examiner* — Hong Shao
(74) *Attorney, Agent, or Firm* — Coats & Bennett, PLLC

(57) ABSTRACT

The present disclosure relates to methods and devices for synchronizing one or more radio devices with a radio access node. A method of providing synchronization with a radio access node for radio communication to one or more radio devices is disclosed. The method comprises or triggers transmitting a configuration message to at least one of the radio devices, where the configuration message is indicative of a synchronization signal configuration for a configurable synchronization signal. The method further comprises or triggers transmitting the configurable synchronization signal to the at least one radio device in accordance with the synchronization signal configuration and communicating one or more decodable signals between the radio access node and the at least one radio device using radio resources in accordance with the configurable synchronization signal. A corresponding method of synchronizing the radio device
(Continued)

with the radio access node for radio communication is disclosed.

21 Claims, 8 Drawing Sheets

(56) References Cited

U.S. PATENT DOCUMENTS

2018/0109344 A1* 4/2018 Ly ............................ H04J 11/00
2018/0279239 A1 9/2018 Si et al.

OTHER PUBLICATIONS

Ericsson et al., "Revised WID on Even Further Enhanced MTC for LTE", 3GPP TSG RAN Meeting #76, West Palm Beach, USA, Jun. 5, 2017, pp. 1-4, RP-171427, 3GPP.
Ericsson, "Reduced System Acquisition Time for MTC", 3GPP TSG-RAN WG1 Meeting #89, Hangzhou, China, May 15, 2017, pp. 1-5, R1-1709472, 3GPP.
Ericsson, "Reduced System Acquisition Time for NB-IoT", 3GPP TSG-RAN WG1 Meeting #90, Prague, Czech Republic, Aug. 21, 2017, pp. 1-9, R1-1712629, 3GPP.
Ericsson, "On MIB Acquisition Time in Rel-15 LTE MTC", 3GPP TSG RAN WG4 Meeting #84, Berlin, Germany, Aug. 21, 2017, pp. 1-4, R4-1708321, 3GPP.
Ericsson, "SI Acquisition Time Improvement for eFeMTC", 3GPP TSG-RAN WG4 Meeting #84, Berlin, Germany, Aug. 21, 2017, pp. 1-5, R4-1707678, 3GPP.
Ericsson, "Reduced System Acquisition Time for efeMTC UEs", 3GPP TSG-RAN WG2 #99, Berlin, Germany, Aug. 21, 2017, pp. 1-6, R2-1708625, 3GPP.
Ericsson, "Reduced System Acquisition Time for MTC", 3GPP TSG-RAN WG1 Meeting #90, Prague, Czech Republic, Aug. 21, 20171, pp. 1-4, R1-1712983, 3GPP.
3RD Generation Partnership Project, "3rd Generation Partnership Project; Technical Specification Group Radio Access Network; Study on Provision of Low-Cost Machine-Type Communications (MTC) User Equipments (UEs) Based on LTE (Release 12)", Technical Report, 3GPP TR 36.888 V12.0.0, Jun. 1, 2013, pp. 1-55, 3GPP.
3RD Generation Partnership Project, "3rd Generation Partnership Project; Technical Specification Group Radio Access Network; Evolved Universal Terrestrial Radio Access (E-UTRA); User Equipment (UE) Procedures in Idle Mode (Release 14)", Technical Specification, 3GPP TS 36.304 V14.3.0, Jun. 1, 2017, pp. 1-49, 3GPP.
Balasubramanya, N. et al., "On Timing Reacquisition and Enhanced Primary Synchronization Signal (ePSS) Design for Energy Efficient 3GPP LTE MTC", IEEE Transactions on Mobile Computing, vol. 16 No. 8, Aug. 1, 2017, pp. 2292-2305, IEEE.
Sierra Wireless et al., "Coverage Analysis of LTE-M Category-M1", White Paper, Verison 1.0, Jan. 1, 2017, pp. 1-20, Sierra Wireless.
RAN1, "LS on System Acquisition Time Reduction for Rel-15 LTE MTC", 3GPP TSG RAN WG1 Meeting #89, Hangzhou, China, May 15, 2017, pp. 1, R1-1709834, 3GPP.
Ericsson et al., "Way Forward on Simulation Assumptions for Reduced System Acquisition Time", 3GPP TSG RAN WG1 Meeting #88bis, Spokane, USA, Apr. 3, 2017, pp. 1-4, R1-1706583, 3GPP.
3RD Generation Partnership Project, "3rd Generation Partnership Project; Technical Specification Group Radio Access Network; Study on Scenarios and Requirements for Next Generation Access Technologies; (Release 14)", Technical Report, 3GPP TR 38.913 V14.0.0, Oct. 1, 2016, pp. 1-39, 3GPP.

\* cited by examiner

RADIO SYNCHRONIZATION TECHNIQUE

TECHNICAL FIELD

The present disclosure generally relates to a technique for synchronizing participants in a radio communication. More specifically, and without limitation, methods and devices are provided for synchronizing one or more radio devices with a radio access node.

BACKGROUND

In order to wirelessly connect to a network with defined time structure, e.g., a scheduled radio access network (RAN), a radio device performs network synchronization (briefly: synchronization). The synchronization includes adjusting the frequency of the radio device relative to the RAN and finding the proper timing of the RAN. In existing cellular RANs, such as Long Term Evolution (LTE) specified by the 3rd Generation Partnership Project (3GPP), the radio device (e.g., a user equipment or UE) performs synchronization based on a primary synchronization signal (PSS) and a secondary synchronization signal (SSS).

The PSS allows for network detection with a high frequency error, up to tens of ppm. Additionally, the PSS provides a network timing reference. In 3GPP LTE, Zadoff-Chu (ZC) sequences are used as PSS signals. ZC sequences are of constant amplitude and appear in both time domain and frequency domain. Thus, a ZC sequence may be multiplexed in the frequency domain together with other data and detected in the time domain, allowing for a simplified detector. Three different sequences are used as the PSSs, which allow for an initial cell identification with reasonable complexity, e.g. by correlating the received signal in the time domain with each of the three known sequences. 3GPP LTE systems transmit one PSS in one Orthogonal Frequency-Division Multiplexing (OFDM) symbol every 5 subframes or 70 OFDM symbols, i.e., every 5 ms. When the UE has no information about the timing of the PSS transmissions, such as at initial access (i.e., at initial cell search) or after a considerable timing drift when not having a sustained connection to the RAN, the UE must have its receiver turned on for 5 ms to guarantee not to miss a PSS transmission, even if the PSS itself last only for about 70 µs.

The SSS allows for more accurate frequency adjustments and channel estimation while at the same time providing fundamental information of the RAN. In 3GPP LTE implementations, maximum length sequences (MLSs or m-sequences) are used for the different SSSs. In total 168 basic SSS sequences are defined in order for the RAN to use PSS and SSS to represent in total 504 cell IDs. Having detected the SSS, the UE may continue to read the Physical Broadcast Channel (PBCH) in order to identify and receive the master information block (MIB) followed by the system information blocks (SIBs), namely SIB 1 and SIB 2, prior to performing random access. The SSS is also transmitted in one OFDM symbol every 5 subframes or 70 OFDM symbols, i.e., every 5 ms.

Conventionally, in order to resynchronize to the RAN, a radio device may use both the PSS and the SSS. Assuming that no movement has occurred, the underlying PSS sequence and SSS sequence are already known. In the case of limited mobility, the radio device may rely on information about its neighboring cells. By using both sequences, the radio device has twice as many samples for a time domain correlation operation compared to the case when only one of the two were used.

However, since only two symbols out of 70 OFDM symbols (i.e., 5 subframes each comprising 14 OFDM symbols) in a 5 ms interval are used for the synchronization, channel conditions with extremely low signal-to-noise ratios (SNRs) require averaging over multiple synchronization signals (PSSs and/or SSSs), which is a very expensive operation due to the sparse transmission of the synchronization signals. Machine-to-Machine (M2M) is an important use case with such low SNRs. Up to 640 synchronization signals or even more can be necessary for worst situations, which implies synchronization durations of almost two seconds. From a power consumption perspective, this is extremely costly, and a significant limitation in device longevity.

While initial access synchronization may be as costly as a later resynchronization, the initial access synchronization is typically only performed once, whereas resynchronization may be performed regularly gain and again, e.g., with a periodicity of tens of seconds. Hence, in terms of time and energy consumption, resynchronization poses a substantial problem.

The evolution of radio communication techniques, e.g. in the framework of 3GPP for a New Radio (NR) technique, aim at meeting M2M and Internet of Things (IoT) related use cases. Most recent work for 3GPP LTE Releases 13 and 14 include enhancements to support Machine-Type Communication (MTC) devices with specific device categories, namely Cat-M1 and Cat-M2, supporting a reduced bandwidth of 6 physical resource blocks (PRBs) and up to 24 PRBs for Cat-M2, as well as enhancements to support Narrowband IoT (NB-IoT) devices using a specific radio interface with specific device categories, namely Cat-NB1 and Cat-NB2.

Such enhancements may be regarded as enhancements to LTE. Herein, the enhancements introduced in 3GPP Releases 13, 14 and 15 for MTC are collectively referred to as enhanced MTC or eMTC, including (without limitation thereto) the support for bandwidth-limited devices such as Cat-M1 and the support for coverage enhancements. Moreover, the term eMTC may be used to distinguish M2M uses cases from other NB-IoT uses cases, which term is here used for any 3GPP Release, although the features supported by eMTC and NB-IoT are similar on a general level.

There are multiple differences between existing LTE and the procedures and channels defined for eMTC and for NB-IoT. Some important differences include specific physical channels, such as the physical downlink control channels referred to as MPDCCH for eMTC devices and NPDCCH for NB-IoT devices, as well as a specific physical random access channel referred to as NPRACH for NB-IoT devices.

Objectives for 3GPP Release 15, relating to both NB-IoT and eMTC, for an even further enhanced MTC (also referred to as efeMTC) according to the document 3GPP RP-170732 for 3GPP TSG RAN Meeting #75, include improving latency, namely reducing system acquisition time (particularly for cell search and/or system information including MIB and SIB1 with bandwidth reduction, SIB1-BR) and acquisition performance, optionally also for connected mode DRX.

Power consumption reduction for physical channels in idle mode paging and/or connected mode DRX is a further objective. The 3GPP TSG RAN1 Meeting #90 agreed on the working assumption that, for idle mode, a power saving physical signal shall indicate whether the UE needs to decode subsequent physical channels for idle mode paging.

Improving latency and improving power consumption are related in that both depend on the synchronization prior to executing further tasks. However, the conventional synchronization for existing LTE was originally developed for mobile broadband applications, which did not consider the extremely low SNRs relevant for MTC. Hence, for lower SNRs, the existing synchronization is a cumbersome task. The UE needs multiple repetitions of the synchronization signal in order to receive it correctly, while the synchronization signals are transmitted relatively seldom with one PSS and one SSS every 5 subframes or 5 ms, which leads to an inacceptable consumption of time and energy for the synchronization.

SUMMARY

Accordingly, there is a need for a synchronization technique that reduces energy consumption or latency in at least some situations. Alternatively, or more specifically, there is a need for a technique that efficiently synchronizes radio devices with different radio conditions or capabilities without compromising network overhead.

As to one aspect, a method of providing synchronization with a radio access node for radio communication to one or more radio devices is provided. The method comprises or triggers a step of transmitting a configuration message to at least one of the radio devices, the configuration message being indicative of a synchronization signal configuration for a configurable synchronization signal. The method further comprises or triggers a step of transmitting the configurable synchronization signal to the at least one radio device in accordance with the synchronization signal configuration. The method further comprises or triggers a step of communicating one or more decodable signals between the radio access node and the at least one radio device using radio resources in accordance with the configurable synchronization signal.

At least some embodiments of the technique provide a configurable synchronization signal. The configurable synchronization signal may also be referred to as a resynchronization signal or a configurable resynchronization signal, e.g., because the configurable synchronization signal may be not the first synchronization signal used by the radio device and/or may be not the only synchronization signal received by the radio device for synchronization with the radio access node. The technique is applicable to machine-to-machine (M2M) communication. Same or further embodiments exchange data in a radio communication involving discontinuous reception (DRX). Particularly, the method may be implemented for controlling, e.g., by the RAN, power supply and synchronization of a receiver at the radio device.

The decodable signals may be encoded with data. The data may comprise user data or control data (e.g., control signaling). At least in some embodiments, the decodable signals may be a physical signal that can be efficiently decoded and/or detected prior to decoding further control signaling.

The synchronization signal may be implemented using a specific channel. The synchronization signal or the channel may be defined in terms of time and/or frequency resources and/or spatial streams according to the synchronization signal configuration.

The term radio device may encompass a device for machine-type communication (MTC), an enhancement thereof (eMTC), a device for narrowband Internet of things (NB-IoT) applications or a broadband device. In the context of a 3GPP implementation, without being limited thereto, the radio device may also be referred to as a user equipment (UE).

The one aspect of the technique may be implemented at the RAN, e.g., at the node.

As to another aspect, a method of synchronizing a radio device with a radio access node for radio communication is provided. The method comprises or triggers a step of receiving a configuration message from the radio access node, the configuration message being indicative of a synchronization signal configuration for a configurable synchronization signal. The method further comprises or triggers a step of receiving the configurable synchronization signal from the radio access node in accordance with the synchronization signal configuration. The method further comprises or triggers a step of communicating one or more decodable signals between the radio access node and the radio device using radio resources in accordance with the configurable synchronization signal.

The other aspect of the technique may be implemented at the radio device.

The technique according to the other aspect may comprise any feature or any step disclosed in the context of the one aspect, or a feature or a step corresponding to the one aspect.

In any aspect, the radio access node (or briefly: node) may be a base station or a cell of a network, e.g., a radio access network (RAN). The network may comprise the RAN and a core network (CN) connected to the RAN. Alternatively, or in addition, the radio access node or the RAN may be connected to the Internet, e.g., via a gateway server. The radio access node may encompass any station that is configured to provide radio access to the radio device. The technique may be implemented at the node in relation to a plurality of the radio devices. For example, multiple radio devices may camp on the cell or may be in a connected discontinuous reception (DRX) mode with the radio access node.

The radio device may be configured for peer-to-peer communication, e.g., on a sidelink to another radio device under the synchronization defined by (and optionally radio resource scheduling by) the radio access node. Alternatively or in addition, the radio device may be configured for accessing the radio access node and/or the RAN. The communicating step may comprise an uplink (UL) to the radio access node and/or a downlink (DL) from the radio access node. The radio device may be a UE, a mobile or portable station (STA, e.g. a Wi-Fi STA), a device for IoT, particularly NB-IoT, MTC, eMTC or a combination thereof. Examples for the UE and the mobile station include a mobile phone and a tablet computer. Examples for the portable station include a laptop computer and a television set. Examples for the MTC or eMTC device include robots, sensors and/or actuators, e.g., in manufacturing and automotive communication. Examples for the NB-IoT device include sensors for security systems and home automation. The radio device may be implemented in household appliances and consumer electronics. Examples for the combination include a self-driving vehicle, a door intercommunication system and an automated teller machine.

Examples for the radio access node may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

Each aspect of the technique may be implemented (e.g., partly or completely) on a Physical Layer (PHY) of a protocol stack for the radio communication. The technique may be supported or controlled by a Medium Access Control (MAC) layer, a Radio Link Control (RLC) layer and/or a Radio Resource Control (RRC) layer of the protocol stack for the radio communication between the radio access node and the radio device.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the RAN, via the Internet, through the radio access node and/or through the radio device. Alternatively or in addition, any of the method aspects may be encoded in a Field-Programmable Gate Array (FPGA) and/or an Application-Specific Integrated Circuit (ASIC), or the functionality may be provided for download by means of a hardware description language.

As to one device aspect, a device for providing synchronization with a radio access node for radio communication to one or more radio devices is provided. The device is configured to perform the one method aspect.

As to another device aspect, a device for synchronizing a radio device with a radio access node for radio communication is provided. The device is configured to perform the other method aspect.

As to a still further aspect, a device for providing synchronization with a radio access node for radio communication to one or more radio devices is provided. The device comprises at least one processor and a memory. Said memory comprises instructions executable by said at least one processor whereby the device is operative to transmit a configuration message to at least one of the radio devices, the configuration message being indicative of a synchronization signal configuration for a configurable synchronization signal; to transmit the configurable synchronization signal to the at least one radio device in accordance with the synchronization signal configuration; and to communicate one or more decodable signals between the radio access node and the at least one radio device using radio resources in accordance with the configurable synchronization signal.

As to a still further aspect, a device for synchronizing a radio device with a radio access node for radio communication is provided. The device comprises at least one processor and a memory. Said memory comprises instructions executable by said at least one processor whereby the device is operative to receive a configuration message from the radio access node, the configuration message being indicative of a synchronization signal configuration for a configurable synchronization signal; to receive the configurable synchronization signal from the radio access node in accordance with the synchronization signal configuration; and to communicate one or more decodable signals between the radio access node and the radio device using radio resources in accordance with the configurable synchronization signal.

As to a still further aspect, a device providing synchronization with a radio access node for radio communication to one or more radio devices is provided. The device may comprise one or more modules for performing the one method aspect. Alternatively or in addition, the device comprises a configuration transmission module for transmitting a configuration message to at least one of the radio devices, the configuration message being indicative of a synchronization signal configuration for a configurable synchronization signal. The device further comprises a synchronization signal transmission module for transmitting the configurable synchronization signal to the at least one radio device in accordance with the synchronization signal configuration. The device further comprises a communication module for communicating one or more decodable signals between the radio access node and the at least one radio device using radio resources in accordance with the configurable synchronization signal.

As to a still further aspect, a device for synchronizing a radio device with a radio access node for radio communication is provided. The device may comprise one or more modules for performing the other method aspect. Alternatively or in addition, the device comprises a configuration reception module for receiving a configuration message from the radio access node, the configuration message being indicative of a synchronization signal configuration for a configurable synchronization signal. The device further comprises a synchronization signal reception module for receiving the configurable synchronization signal from the radio access node in accordance with the synchronization signal configuration. The device further comprises a communication module for communicating one or more decodable signals between the radio access node and the radio device using radio resources in accordance with the configurable synchronization signal.

Any one of the devices (or any node or station for embodying the technique) may further include any feature disclosed in the context of the corresponding one of the method aspects. Particularly, any one of the units and modules, or a dedicated unit or module, may be configured to perform or trigger one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 3GPP LTE implementation within the framework for machine-type communication, it is readily apparent that the technique described herein may also be implemented in any other radio network, including NB-IoT or other modes of operation within 3GPP LTE or a successor thereof, 5G New Radio (NR), Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
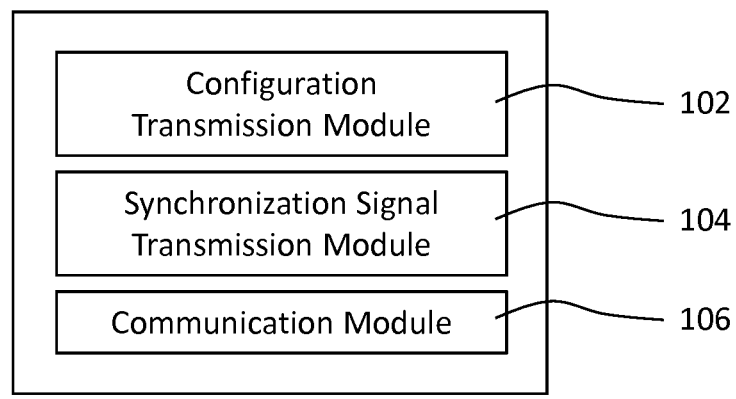
FIG. 1 shows a schematic block diagram of a device for providing synchronization with a radio access node for radio communication to one or more radio devices.

FIG. 1 schematically illustrates a block diagram of a device for providing synchronization with a radio access node for radio communication to one or more radio devices. The device is generically referred to by reference sign 100.

The device 100 comprises a configuration transmission module 102 that transmits a configuration message to at least one of the radio devices. The configuration message is indicative of a synchronization signal configuration for a configurable synchronization signal. The device 100 further comprises a synchronization signal transmission module 104 that transmits the configurable synchronization signal to the at least one radio device in accordance with the synchronization signal configuration. The device 100 further comprises a communication module 106 that communicates (e.g., receives and/or transmits) one or more decodable signals between the radio access node and the at least one radio device. The communication uses radio resources in accordance with the configurable synchronization signal.

The device 100 may be connected to and/or part of the radio access node or a RAN comprising the radio access node. The device 100 may be embodied by or at the radio access node of the RAN, other nodes connected to the RAN for controlling the radio access node or a combination thereof. The device 100 may be spatially separated from the radio device.

Any of the modules of the device 100 may be implemented by units configured to provide the corresponding functionality.

Figure 2:
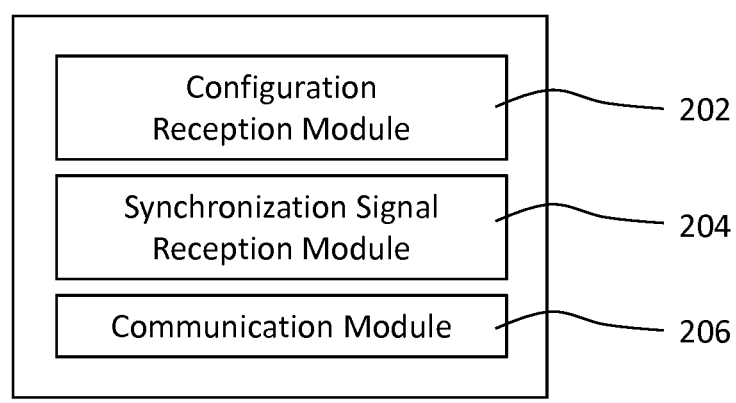
FIG. 2 shows a schematic block diagram of a device for synchronizing a radio device with a radio access node for radio communication.

FIG. 2 schematically illustrates a block diagram of a device for synchronizing a radio device with a radio access node for radio communication. The device is generically referred to by reference sign 200.

The device 200 comprises a configuration reception module 202 that receives a configuration message from the radio access node. The configuration message is indicative of a synchronization signal configuration for a configurable synchronization signal. The device 200 further comprises a synchronization signal reception module 204 that receives the configurable synchronization signal from the radio access node in accordance with the synchronization signal configuration. The device 200 further comprises a communication module 204 that communicates (e.g., receives and/or transmits) one or more decodable signals between the radio access node and the radio device using radio resources in accordance with the configurable synchronization signal.

The device 200 may be connected to and/or part of the radio device. The device 200 may be embodied by or at the radio device. The device 200 may be spatially separated from the radio access node and/or the RAN.

Any of the modules of the device 200 may be implemented by units configured to provide the corresponding functionality.

The radio access node may also be referred to as a base station. The radio access node may be configured to provide radio access to the one or more radio devices. The radio access node may encompass a network controller (e.g., a Wi-Fi access point) or a cellular radio access node (e.g. a 3G Node B, a 4G eNodeB or a 5G gNodeB). It may further encompass a user equipment (UE) or any other type of devices acting as a relay node by providing the same or similar radio access functionality to other radio devices, e.g., as a cellular radio access node.

Alternatively or in addition, any one of the radio devices may include a mobile or portable station or any radio device wirelessly connectable to the RAN. Each radio device may be a user equipment (UE) and/or a device for machine-type communication (MTC), particularly enhances MTC (eMTC). Two or more radio devices may be configured to wirelessly connect to each other, e.g., via 3GPP sidelinks and/or according to a scheduling provided by the radio access node.

Each aspect, or a further aspect, of the technique may be implemented as a synchronization signal configuration specifying the usage (e.g., whether the signal is actively used or deactivated, and/or parameters of the signal) of the configurable synchronization signal. Any implementation may be combined with a power-saving signal configuration specifying the usage of the power-saving signal (e.g., whether the power-saving signal is actively used or deactivated, and/or one or more parameters of the power-saving signal). Alternatively or in addition, any implementation may be combined with a discontinuous reception configuration (DRX configuration) specifying a discontinuous reception (DRX) performed by the radio device (e.g., whether the DRX is performed or deactivated, and/or one or more parameters of the DRX). The synchronization signal configuration and/or the power-saving signal configuration may be part of the DRX configuration. Herein, "DRX" encompasses enhanced DRX (eDRX). DRX may be performed in an idle mode, e.g., for paging, or in a connected mode of the radio device. Embodiments of the technique may be compatibility with section 7 of the document 3GPP TS 36.304, e.g., version 14.3.0.

The technique may be embodied by a configurable synchronization signal for network resynchronization, e.g., not primarily intended for an initial access. Alternatively or in addition, the configurable synchronization signal may be configured to provide or support the synchronization of the radio device prior to or in an active phase of the DRX for the radio communication. The active phases may comprise idle mode operations such as at least one of paging, verification of system information and measurements for radio resource management (RRM).

The one or more radio devices may comprise one or more MTC devices. Due to extremely varying demands and/or capabilities of MTC devices and/or extremely varying demands and/or capabilities of network deployments supporting MTC devices, the configurable synchronization signal is configurable by means of the configuration message. By means of the synchronization signal configuration in the configuration message, a utilization of resource elements (REs) for the configurable synchronization signal or any other parameter of the configurable synchronization signal can be variable, e.g., controlled by the RAN or the CN.

The synchronization signal configuration, e.g., the length of the configurable synchronization signal, may dependent on a figure $R_{max}$. The figure $R_{max}$ is an indication of the maximum number of repetitions that is supported by the radio access node or a corresponding cell of the radio access node. The figure $R_{max}$ may be applied for different physical channels, e.g., including the configurable synchronization signal. By making the synchronization signal configurable (and/or reconfigurable), it is possible to keep a network overhead low. The network overhead may be defined as the radio resources allocated to signaling such as synchronization as compared to the available radio resources. The technique may be implemented to keep the network overhead low in RANs or cells supporting radio devices under moderate SNR levels (or expected to operate under moderate SNR levels), while also allowing the RAN or the cell to support radio devices under low SNR levels with the associated higher overhead (e.g., greater number of repetition as compared to the radio devices under moderate SNR levels). To this end, the synchronization signal configuration may vary with time and/or be radio device-specific. Further parameters of the synchronization signal configuration (e.g., depending on an expected load), may comprise a periodicity of the configurable synchronization signal. Preferably, the configurable synchronization signal may be transmitted by the radio access node and received by the radio device prior to a periodic communication event, e.g., a paging occasion.

Figure 3:
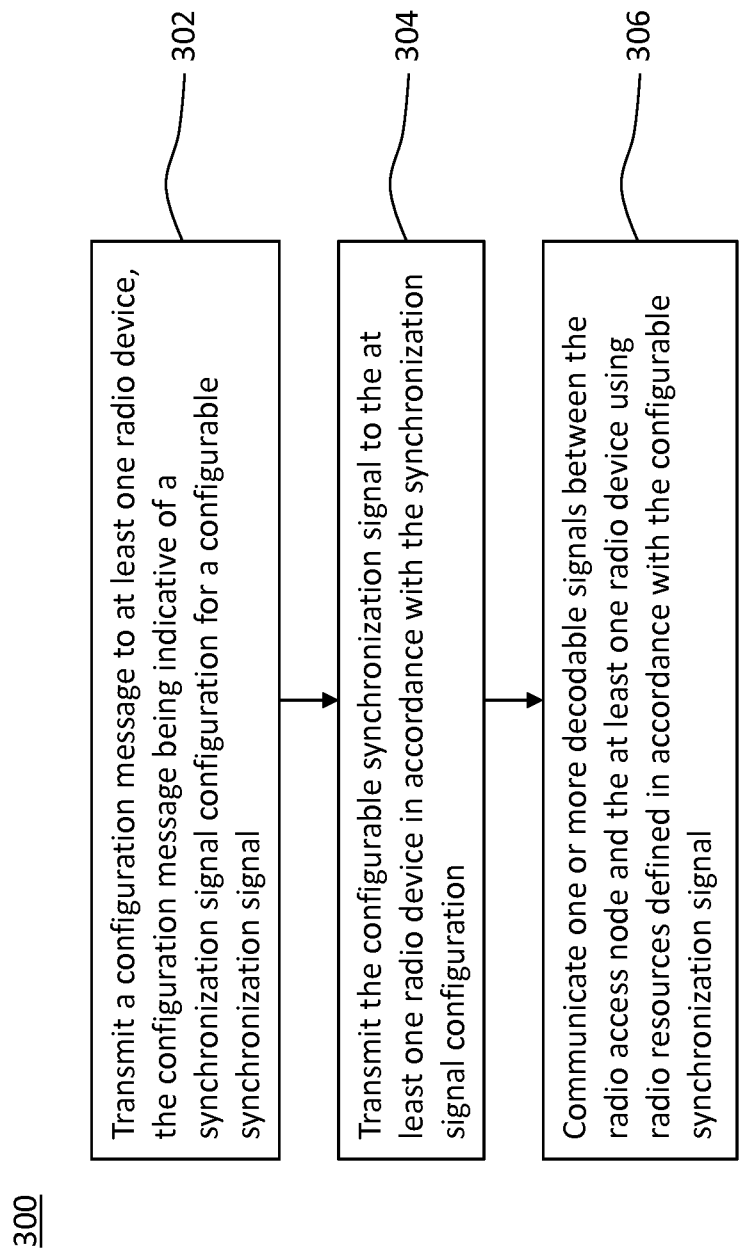
FIG. 3 shows a flowchart for a method of providing synchronization with a radio access node for radio communication to one or more radio devices, which is implementable by the device of FIG. 1.

FIG. 3 shows a flowchart for a method 300 of providing synchronization with a radio access node for radio communication to one or more radio devices. The method 300 comprises a step 302 of transmitting a configuration message to at least one of the radio devices. The configuration message is indicative of a synchronization signal configuration for a configurable synchronization signal. In a step 304 of the method 300, the configurable synchronization signal is transmitted to the at least one radio device in accordance with the synchronization signal configuration. The method 300 further comprises a step 306 of communicating (e.g., receiving from and/or transmitting to the radio access node) one or more decodable signals between the radio access node and the at least one radio device. The communication 306 uses radio resources in accordance with the configurable synchronization signal, e.g., in accordance with the synchronization provided or supported by the configurable synchronization signal when received at the at least one radio device.

The method 300 may be performed by the device 100, e.g., at or using the radio access node. For example, the modules 102, 104 and 106 may perform the steps 302, 304 and 306, respectively.

The step of transmitting the configuration message and/or the step of transmitting the configurable synchronization signal may be implemented by radio transmissions to the at least one radio device. The step of communicating decodable signals may be implemented by a radio communication between the radio access node and the at least one radio device.

At least one of the configuration message and the configurable synchronization signal may be transmitted from the radio access node.

The communication of the decodable signals may comprise an uplink radio communication to the radio access node and/or a downlink radio communication to the radio access node.

The radio resources in accordance with the configurable synchronization signal may encompass any radio resources in accordance or consistency with the synchronization brought about by the configurable synchronization signal. Particularly, the radio resources in accordance with the configurable synchronization signal may encompass any radio resources that are defined in time and/or frequency (e.g., in time frames or time-frequency grids) in accordance with or in consistency with the synchronization defined by configurable synchronization signal. The radio resources may be defined in accordance with or in consistency with the configurable synchronization signal.

The radio resources may also be in accordance with a predefined (e.g., not configured or not configurable) synchronization signal, e.g., with the PSS and/or the SSS. The synchronization provided by the PSS and/or the SSS may be consistent with, or equal to, the synchronization provided by the configurable synchronization signal. The radio device may combine (e.g., average over) the predefined synchronization signal and the configurable synchronization signal, or multiple receptions thereof.

The radio access node may be configured to provide radio access to the one or more radio devices, e.g., in one or more cells of the radio access node or of the RAN. For example, all or some of the radio devices may be in a coverage area of one of the cells. The radio access node may be a base station of the RAN.

The radio access node may provide radio access to a plurality of the radio devices. In the idle mode, the corresponding radio device may camp on the radio access node or a tracking area (TA) including the cell or the radio access node.

The radio access node may transmit different configuration messages to disjoint groups of the radio devices. Different configuration messages indicative of different synchronization signal configurations (and, for example, different configurable synchronization signals according to the respective configuration messages) may be transmitted to the radio devices belonging to different groups.

The groups and/or the one or more radio devices may be distinguished (e.g., for the purpose of transmitting the synchronization signal configuration) by at least one of a device category, a channel quality, a length of the configurable synchronization signal (e.g., including a number of repetitions and/or a coding pattern) and a maximum number of control signal repetition.

The radio device may measure and/or report the channel quality to the network (e.g., the RAN and/or the CN). The channel quality may be related to, or represented by, a signal-to-noise ratio (SNR), a signal to noise and interference ratio (SNIR), a channel quality indicator (CQI), a reference signal received power (RSRP) and a reference signal received quality (RSRQ).

The channel quality, any one of the afore-mentioned quantities (e.g., SNR, SNIR, CQI, RSRP and RSRQ) and/or quantities for radio resource management (RRM) or Radio Link Monitoring (RLM) may be based on one or more measurements performed by the radio device. These measurements may, for example, be performed on the actual configurable synchronization signal (e.g., the configurable synchronization signal as received and/or detected at the radio device) and/or any other auxiliary channel or auxiliary signal, such as, for example, but not limited to, Cell-specific Reference Signals (CRS). The auxiliary channel or signal is transmitted on radio resources that the radio device is able to determine in accordance with the configurable synchronization signal. For example, the channel quality, or any one of the afore-mentioned quantities, may depend on and/or may be a measure for the accuracy of the synchronization provided or supported by the configurable synchronization signal to the radio device.

For example, in the M2M domain, several different use cases are imaginable. One kind of network or one group of radio devices may be associated with (e.g., expected or profiled to support) extremely low SNRs, e.g., a maximum coupling loss (MCL) of 164 dB. Another kind of network or another group of radio devices may be associated with (e.g., expected or profiled to support) devices with extremely long paging intervals, up to several hours. This implies that the requirements on a resynchronization signal will differ significantly, due to the different network profiles or group profiles. The profiles associated with each of the radio devices may be based on the reports. The profiles may be stored in a radio device context associated with the corresponding radio device, e.g., at a mobility management entity (MME) of the CN. The one synchronization signal configuration for the synchronization signal that is preferred in the one kind of network or the one group of radio devices may be adverse in the other kind of network or the other group of radio devices.

Alternatively or in addition, at least one of the configuration message, the synchronization signal configuration and the configurable synchronization signal may be cell-specific. For example, different synchronization signal configurations may be transmitted in different cells of the RAN (e.g., different cells of the same radio access node). Any configuration message indicative of a cell-specific synchronization signal configuration may be advantageously transmitted as a broadcast message, e.g., as system information.

Alternatively or in addition, at least one of the configuration message, the synchronization signal configuration and the configurable synchronization signal is radio device-specific. At least one of the configuration message, the synchronization signal configuration and the configurable synchronization signal may depend on a report received from the radio device, a device category, a quality of service (QoS) requirement of the radio device and a QoS class indicator (QCI) of the radio device. Any configuration message indicative of a radio device-specific synchronization signal configuration may be advantageously transmitted as a dedicated radio resource control (RRC) signaling message (without precluding alternative implementation).

For the at least one radio device, the configurable synchronization signal may provide or support the synchronization with the radio access node. The synchronization of the at least one radio device may be exclusively based on the configurable synchronization signal. Optionally, the synchronization of the at least one radio device may be supported by the configurable synchronization signal. Supporting the synchronization by the configurable synchronization signal may encompass reducing the time for completing the synchronization (as compared to completing the synchronization exclusively based on predefined synchronization signals) and/or improving an accuracy of the synchronization (as compared to completing the synchronization exclusively based on predefined synchronization signals).

The configurable synchronization signal may provide or support at least one of a timing synchronization with the radio access node, a frequency synchronization with the radio access node, a phase synchronization with the radio access node and a channel estimate for a radio channel to or from the radio access node. The timing synchronization may enable the radio device to reduce or eliminate a time shift relative to the radio access node. The frequency synchronization may enable the radio device to reduce or eliminate a frequency shift relative to the radio access node. The phase synchronization and/or the channel estimate may enable the radio device to reduce or eliminate a phase shift and/or an attenuation factor relative to the radio access node.

The configurable synchronization signal may provide or support the synchronization for communicating the one or more decodable signals on the radio resources. The radio resources may be structured in at least one of time frames, time slots, subframes, transmission time intervals (TTIs), subcarriers and resource blocks (RBs).

The configurable synchronization signal may provide or support a downlink synchronization. The configurable synchronization signal may provide or support the synchronization with the radio access node for the communication in a downlink from the radio access node to the at least one radio device.

The communicating step may include receiving the one or more decodable signals comprising a power-saving signal. The power-saving signal may be indicative of an instruction for operating a receiver at the radio device. The power-saving signal may comprise a wake-up signal (WUS). The WUS may be indicative of an instruction for enabling the receiver, e.g., at a later point in time, such as for reception of further channels or signals. According to the WUS, the at least one radio device may enable its receiver for receiving the decodable signals in the communication on the radio resources. The radio resources may be defined within a radio resource grid for REs in time and/or frequency in accordance with the DRX configuration (e.g., as a transmission opportunity or idle mode paging). The grid of REs may be defined time and/or frequency in accordance with the synchronization provided or supported by the configurable synchronization signal. Alternatively and in addition, the power-saving signal may comprise a go-to-sleep signal (GTS). The GTS may be indicative of disabling the receiver, e.g., until the next time (e.g., according to the periodicity) for at least one of resynchronization, reception or transmission.

The configuration message, or a further configuration message transmitted to at least one of the radio devices, may be indicative of a power-saving signal configuration for the power-saving signal. The power-saving signal may be selectively transmitted by the radio access node depending on the power-saving signal configuration. The power-saving signal configuration may be selectively expected by the radio device depending on the power-saving signal configuration, e.g., by selectively enabling its receiver for receiving the power-saving signal. The network, e.g., the RAN or the CN, may change the power-saving signal configuration to activate or deactivate the usage of the power-saving signal, e.g., depending on whether or not, respectively, the power-saving signal reduces power consumption at the corresponding radio device. Alternatively or in addition, the network, e.g., the RAN or the CN, may change the power-saving signal configuration to activate or deactivate the usage of the power-saving signal, e.g., depending on whether or not, respectively, the network overhead is (e.g., on average) reduced.

The configuration message, or a further configuration message transmitted to at least one of the radio devices, may be indicative of the DRX configuration for a DRX operation of the at least one radio device or another one of the radio devices.

The radio device may be in an idle mode or a connected mode with the radio access node, e.g., according to a radio resource control (RRC) layer of a protocol stack for the radio communication.

Herein, "DRX" may encompass extended DRX (eDRX), e.g., according to the document 3GPP TS 36.304, version 13.3.0 (or later). The DRX configuration may be specific for and/or dedicated to the radio device. Alternatively or in addition, the DRX configuration may be specific for and/or dedicated to a group of radio devices, the radio access node or a cell of the RAN.

The radio device may be in a sleep mode (e.g., as an inactive phase of the DRX) relative to the radio access node prior to the step of transmitting the configurable synchronization signal. Alternatively or in addition, the radio device may be configured for performing idle mode paging (e.g., as an active phase of the DRX), e.g., while camped on the radio access node or the cell. The idle mode paging may also be referred to as paging in idle mode, DRX in idle mode or idle mode DRX.

The one or more decodable signals may comprise at least one of control data and user data, e.g., from the radio access node. Examples for the control data include a scheduling assignment and a scheduling grant. The one or more decodable signals may comprise a paging message from or forwarded by the radio access node. The paging message may be an example for user data (e.g., comprising text of a short message service, SMS) or control data (e.g., for updated system information).

The step of communicating may include broadcasting the one or more decodable signals comprising system information. The system information may be broadcasted in a master information block (MIB) and/or one or more system information blocks (SIBs).

The at least one radio device may read the broadcasted system information, e.g., on a physical broadcast channel (PBCH) for the MIB and/or a physical downlink control channel (PDCCH) and a physical downlink shared channel (PDSCH) for the SIBs. The broadcasted system information may be updated relative to a previously broadcasted system information.

The one or more decodable signals may be communicated in an uplink direction from the at least one radio device to the radio access node. For example, the step of communicating the one or more decodable signals may comprise receiving a random access (RA) preamble from the at least one radio device at the radio access node.

The radio resources in accordance with the configurable synchronization signal may comprise a physical random access channel (PRACH). A specific PRACH may be defined for NB-IoT or MTC. The method may further comprise transmitting a random access response (RAR). The RAR may be indicative of a timing advance (TA) providing uplink synchronization with the radio access node to the at least one radio device.

The configuration message and/or the synchronization signal configuration may be indicative of a physical structure of the configurable synchronization signal. The configuration message may be indicative of an allocation of radio resources for the configurable synchronization signal. The physical structure may define resource elements (REs) in at least one of time (e.g., in terms of TTIs or OFDM symbols), frequency (e.g., in terms of subcarriers) and space (e.g., in terms of spatial streams of a multiple-input multiple-output channel) for the configurable synchronization signal.

The configuration message may be indicative of a periodicity of transmitting the configurable synchronization signal. Alternatively or in addition, the configuration message may be indicative of a length of the configurable synchronization signal in the time domain. The configuration message may be indicative of a number of repetitions of the configurable synchronization signal. The configuration message may be indicative of a gap between the repetitions. Repetitions of the configurable synchronization signal may be arranged according to an aperiodic coding pattern.

A coding pattern (e.g., for a long configurable synchronization signal) may be structured to detect (e.g., at the radio device) the configurable synchronization signal based on receiving a portion (e.g., within the coding pattern) of the configurable synchronization signal. Alternatively or in addition, the coding pattern may be structured (e.g., aperiodic) to determine (e.g., at the radio device) a beginning (or another reference point in time) of the configurable synchronization signal based on receiving a portion (e.g., within the coding pattern) of the configurable synchronization signal. As soon as the radio device has determined the beginning (or the other reference point in time) of the configurable synchronization signal by virtue of the coding pattern, the radio device may cease receiving, detecting or decoding a reminder of the configurable synchronization signal. The synchronization signal configuration may be indicative of the coding pattern.

The configurable synchronization signal may be transmitted according to a coding pattern at one or multiple transmission occasions. Sequences or signals transmitted within each transmission occasion and/or in different transmission occasions may be identical or comprise combinations of different sequences or signals.

The configuration message may be indicative of a bandwidth of the configurable synchronization signal in the frequency domain. The bandwidth may depend on the radio device category or the capability of the radio device.

The configurable synchronization signal may be a physical signal. A sequence of complex-valued symbols may be encoded in the configurable synchronization signal. The sequence may yield a constant amplitude or constant-power envelope, e.g., of the configurable synchronization signal. Alternatively or in addition, an autocorrelation of the sequence may vanishing for any (e.g., integer) relative shift of the symbols or may be inversely proportional to the length of the sequence. The sequence may comprise at least one of a Zadoff-Chu sequence and a maximum length sequence (MLS) or m-sequence.

The configurable synchronization signal may be transmitted in addition to at least one predefined synchronization signal transmitted by the radio access node. The configurable synchronization signal may depend on the synchronization signal configuration. For example, the predefined synchronization signal may be cell-specific. Alternatively or in addition, the predefined signal may be independent of a (e.g., cell-specific or radio device-specific) configuration. The predefined signal may be specified upon deployment of the radio access node. The predefined signal may comprise a primary synchronization signal (PSS) and/or a secondary synchronizing signals (SSS). The configurable synchronization signals may be transmitted in addition to at least one of a PSS and a SSS transmitted by the radio access node.

A synchronization with the radio access node upon an initial access of the at least one radio device may be based (e.g., exclusively) on at least one predefined synchronization signal. The configuration message may be transmitted upon or after the initial access.

The configurable synchronization signal may be temporally aligned to radio communication events in the radio communication between the radio access node and the at least one radio device. The events may be scheduled, pre-scheduled, configured and/or semi-persistently scheduled by the radio access node. The events may be periodic. The events may include at least one of a paging occasions (e.g., according to the DRX configuration) and the transmission of the power-saving signal (e.g., according to the power-saving signal configuration).

The configurable synchronization signal may be transmitted temporally ahead of the event. At least one configurable synchronization signal may be transmitted temporally ahead of each of the event. The periodicity of the events may correspond to the periodicity of the configurable synchronization signals.

The configurable synchronization signal may be indicative of a change in system information. The change in the system information may be an example of the event. The system information may be broadcasted by the radio access node, e.g., for the cell. The system information may be broadcasted in a master information block (MIB) and/or one or more system information blocks (SIBs) of the radio access node or a cell associated with the radio access node.

The configuration message may comprise a reference to an entry in a book of synchronization signal configurations. The reference may be an index. The book may be a table or a data structure representing the table. The entry may be a row of the table. The book of configurable synchronization signals may be stored at the radio access node and/or the at least one radio device. The book may be predefined by a standard and/or exchanged between the radio access node and the radio device upon the initial access. Each entry may comprise a set of parameters defining the structure of the associated configurable synchronization signal.

Figure 4:
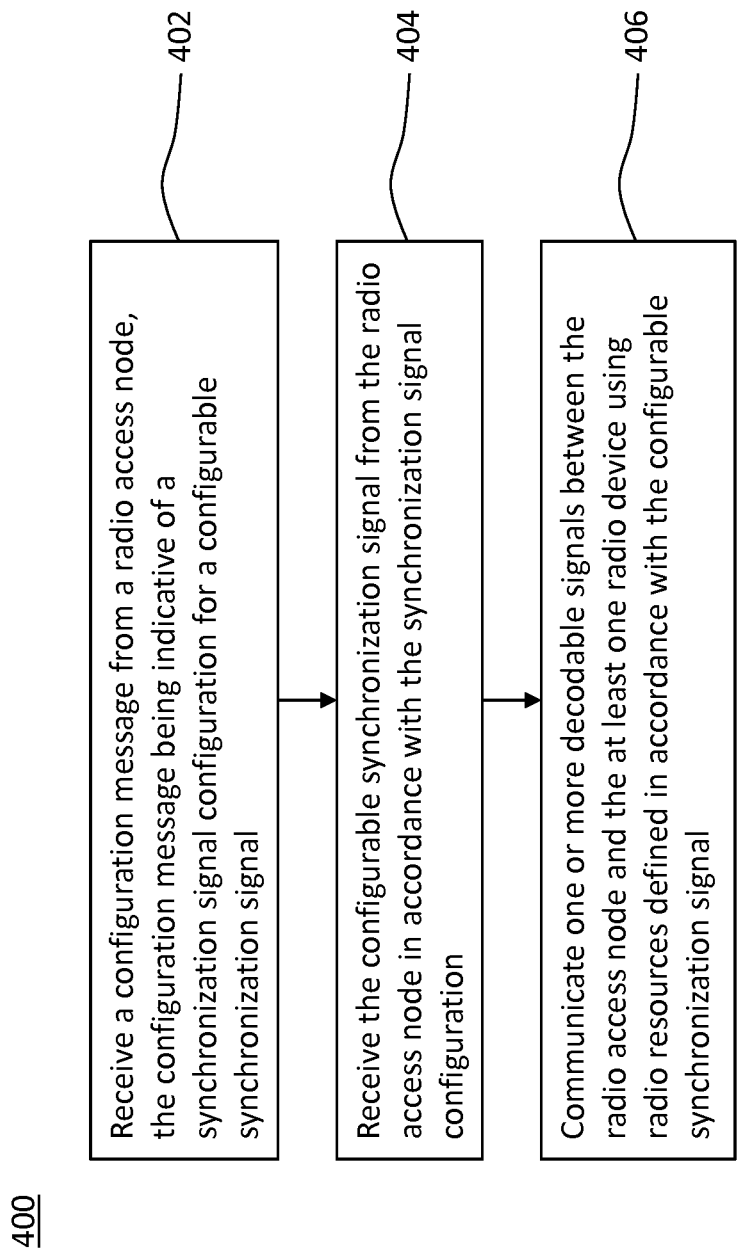
FIG. 4 shows a flowchart for a method of synchronizing a radio device with a radio access node for radio communication, which is implementable by the device of FIG. 2.

FIG. 4 shows a flowchart for a method 400 of synchronizing a radio device with a radio access node for radio communication. The method 400 comprises a step 402 of receiving a configuration message from the radio access node. The configuration message is indicative of a synchronization signal configuration for a configurable synchronization signal. The method 400 further comprises a step 404 of receiving the configurable synchronization signal from the radio access node in accordance with the synchronization signal configuration. In a step 406, one or more decodable signals are communicated between the radio access node and the radio device (e.g., received from and/or transmitted to the radio access node) using radio resources in accordance with the configurable synchronization signal.

The method 400 may be performed by the device 200, e.g., at or using the radio device. For example, the modules 202, 204 and 206 may perform the steps 402, 404 and 406, respectively.

Any embodiment of the method 400 may further comprise any feature or step disclosed in the context of the method 300, as well as features or steps that correspond to those of the method 300 as the devices 100 and 200 are in the radio communication.

Multiple aspects of the technique can be embodied. These aspects include system aspects, network node aspects related to the radio access node and network device aspects related to one of the radio devices and signal aspects related to a signal structure for the configuration message and a signal structure for the configurable synchronization signal.

According to a system aspect, the technique is related to an adaptable system for wireless communications 306 and 406, which is adaptable by means of the configuration message such that the system may provide a configurable resynchronization signal, e.g., according to a specific transmission pattern.

The system comprises the radio access node and one or more radio devices. The radio access node may be any wireless network node (e.g., an eNB and/or gNB) that determines the synchronization signal configuration and configures the radio devices accordingly in the step 302, in addition to transmitting the configurable synchronization signal in the step 304. Each radio device, which may also be referred to as a wireless device or UE, is configured to detect the configurable synchronization signal according to the synchronization signal configuration received in the step 402, e.g., a specific configuration, and then to attempt detecting the configurable synchronization signal in the step 404 according to the synchronization signal configuration.

The synchronization signal configuration may specify the transmission pattern. For example, the synchronization signal configuration comprises at least one of following parameters. A first parameter is the number of repetitions or segments of the configurable synchronization signal, or the sequence encoded therein, used in each transmission occasion. A second parameter is the presence of gaps (i.e., with or without gaps) or duration (i.e., length of the gap) between the repetitions or the segments. A third parameter is the length of the configurable synchronization signal, or the sequence encoded therein. A fourth parameter is the periodicity of transmission occasions of the configurable synchronization signals, or the sequences encoded therein. A fifth parameter is the timing offset for each transmission occasion, e.g., relative to each of the transmission opportunities defined by the DRX configuration or any other communication event. The timing offset may further represent a value for the start of each transmission occasion within the configured periodicity, e.g., represented as a frame number, subframe number, TTI, etc. A sixth parameter comprises a frequency location and the bandwidth, e.g., the number of frequency bands. Each of the frequency bands may consist of a contiguous set of RBs. Each of the frequency bands may be associated with the frequency location and/or the bandwidth used for each transmission occasion. Without limitation, each frequency band may correspond to a partition of a system bandwidth. A radio device of a particular type or radio device category may be scheduled according to its type or category. For example, the radio resources allocated for an NB-IoT radio device may comprise one physical RB (PRB), the radio resources allocated for a Cat-M1 radio device may be one narrow band, i.e., 6 PRBs, the radio resources allocated for a Cat-M2 radio device may be one wide band, i.e., 24 PRBs.

The network, its RAN or its radio access node may configure one or more transmission patterns to cater for different device types (e.g., defined in terms of the radio device categories) and/or coverage levels (e.g., defined in terms of the MCL). For example, for the same coverage target, devices capable of receiving wider bandwidth signal (e.g., Cat M-2 devices) may be configured with a transmission pattern with a small number of repetitions and large bandwidth, while devices capable of receiving narrower bandwidth signal (e.g., Cat M-1 devices) may be configured with a transmission pattern with large number of repetitions and narrower bandwidth. This can allow the radio device, which is capable of receiving the wider bandwidth signal, to finish the resynchronization more quickly.

The time domain parameters of the transmission pattern may be expressed in any suitable time unit or combination of time units, such as OFDM symbols, subframes, radio frames, milliseconds, TTIs, etc. In an example embodiment, these parameters are configured with fixed values, but they may also vary according to ways known to both the radio access node and the radio device. The configurable synchronization signals, or the underling sequences, used within each transmission occasion and/or in different transmission occasions may be identical or comprise combinations of different sequences or signals. The repetitions or combinations may be transmitted with gaps or without gaps.

Similarly, the frequency location and the bandwidth may be expressed in any suitable frequency unit, such as subcarriers, REs, resource blocks, Hertz (Hz), etc. The parameters for the frequency location and/or the bandwidth may be configured to fixed values that are identical for all transmission occasions, or they employ frequency hopping within a transmission occasion and/or between transmission occasions.

Furthermore, the configurable synchronization signals, or the underling sequences, may include (e.g., represent or be encoded with) additional information, e.g., by altering the configurable synchronization signals, or the underling sequences. The included information may comprise at least one of the following pieces of information. A first information is a Cell ID, e.g. the Cell ID also provided through the PSS and the SSS, or some other identity, for distinguishing between signals from different cells. A second information is timing information, e.g., information reflecting a system frame number (SFN), such as a subset of a bit sequence representing the SFN. This may be used to achieve timing resolution after a long timing drift in the radio device (e.g., after a long period of the sleeping mode). A third information is currency or validity of system information (SI) and/or a value tag or hash value, e.g. one or more bits indicating whether the SI has been updated during the last X time units, wherein X may be a configured value or preset in a standardization document. The radio device may use third information to determine that it may read system information less frequently in order to save power. A fourth information is any information related to access barring (AB), e.g. similar or equivalent to a flag indicative that AB is enabled (e.g., similar to an existing flag in the MIB for NB-IoT, such as MIB-NB). If the fourth information is provided in the configurable synchronization signal, the radio device may determine in the step 404 that it does not need not read the MIB and/or the SIBs for confirmation each time before accessing the radio access node or the corresponding cell.

In one implementation compatible with an embodiment, the sequences underlying the configurable synchronization signal (e.g., the sequences mentioned above) may be based on Zadoff-Chu sequences. In another implementation compatible with an embodiment, the sequences may be based on MLSs or m-sequences. Various modifications of such sequences are also possible, which are well known in the art.

In case the additional information is provided in the configurable synchronization signal, the additional information may be conveyed by altering a sequence index such that each sequence index implies a certain piece of information. Alternatively, the information may be conveyed by applying additional scrambling codes, masking, and/or cover codes. These may be applied identically to or differently to each repetition or combination of the configurable synchronization signals or the underling sequences. The number of bits and/or encoding used to represent each type of information can be fixed or variable, for example configured in order to reflect requirements in the current deployment scenario.

In order to improve detection performance, the configurable synchronization signals, or the underling sequences, with a certain sequence length or certain number of repetitions are transmitted in a contiguous resource blocks (RB) in order to reduce a receive duration at the radio device. This does not exclude that within a RB, not all resource elements (RE) may be allocated to the sequence, e.g., due to restrictions in the transmission configuration. By way of example, downlink control information (DCI) configuration and reference signal transmissions may be examples of such restrictions. It may, however, be the case that the same or a predetermined RB utilization is used throughout all RBs.

The synchronization signal configuration of the resynchronization signals may be different in different cells. This may concern any of the above-mentioned parameters in time and/or frequency domain. To facilitate coordination of the resynchronization signals between the cells, specific signaling may be introduced between radio access nodes (e.g., between the base stations), e.g. via the X2 interface in an LTE implementation of the network. Additionally or alternatively, specific signaling may be introduced between the RAN (e.g., the radio access node as one of the base stations) and the CN (e.g., one of the core network nodes), e.g. via the S1 interface between an eNB and an MME within the same tracking area (TA) in an LTE implementation of the network.

In addition, the at least one radio device or any one of the radio devices may receive information about configurable synchronization signals (e.g., resynchronization signals) present (e.g., configured) in neighboring cells, e.g. via RRC signaling. This information may be used by the radio device, e.g., to look for alternative configurable synchronization signals (e.g., resynchronization signals) and/or to apply interference cancellation, e.g., if the configurable synchronization signals overlap at least partially in time and frequency.

According to a base station aspect related to the access node, the technique is realized as the method 300 in a wireless network node (NN) for transmitting configurable synchronization signals from a base station (BS) to a radio device, within a wireless system. The method 300 may further comprise (e.g., as sub-steps of the step 302) at least one of the following steps: a step of determining a transmission pattern of the configurable synchronization signals and a step of allocating the configurable synchronization signal in time-frequency resources. In the step 304, the configurable synchronization signal is transmitted.

The transmission pattern comprises at least one of a configurable number of repetitions, alternatively a configurable sequence length, per transmission occasion; and a configurable periodicity between two consecutive transmission occasions. Alternatively or in addition, the transmission pattern may depend on one or more of the above-mentioned parameters (e.g., those further configuration parameters discussed in relation to the system aspects).

In an implementation of the step of determining the transmission pattern, the NN configures the one or more radio devices connected to the BS to detect the determined transmission pattern according to the step 302. In the step 302, the synchronization signal configuration is performed (i.e., the configuration message is transmitted), e.g., by MPDCCH messaging or System Information broadcast to the one or more radio devices.

In one instance of the step 302, all radio devices in the cell or associated to the radio access node are configured according to the same synchronization signal configuration. In another instance of the step 302 at least some of the radio devices are configured differently, such that, e.g., every 10th configurable synchronization signals is larger (e.g., longer in the time domain), thereby allowing for one or more radio devices with lower SNRs to detect the different configurable synchronization signal. Preferably, the remaining configurable synchronization signals are transmitted with a smaller transmission pattern (e.g., shorter in the time domain).

In any embodiment, the synchronization signal configuration may be transmitted in the step 302 by both broadcast signaling, such as system information, multicast signaling or unicast signaling, such as dedicated RRC signaling. An example of the SI broadcast is that a semi-static synchronization signal configuration is broadcasted in a specific System Information Block (SIB) or added to an existing SIB. Any dynamic change of the synchronization signal configuration may be subject to an existing SI update procedure, that is, possible to update at the broadcast control channel (BCCH) modification boundaries at the fastest.

An example of dedicated RRC signaling comprises using the configurable synchronization signal for resynchronization with DRX or eDRX in the RRC_CONNECTED mode. The configurable synchronization signal may be radio device-specific and also transmitted selectively by the BS, e.g. only when at least one radio device is in RRC_CONNECTED mode. Thus the system overhead is not unnecessarily increased.

In one embodiment, the synchronization signal transmission pattern is configured to be related to a paging periodicity, such that one transmission occasion occurs just prior to possible paging occasions and/or paging time windows depending on the DRX or eDRX cycle. In another embodiment, which is combinable with the one embodiment, the transmission pattern may be configured such that one transmission occasion occurs just prior to a physical broadcast channel (PBCH) transmission. In yet another embodiment, which is combinable with the other embodiments, the transmission 304 may be related to a physical random access channel (PRACH) periodicity. In a fourth embodiment, which is combinable with any of aforementioned three other embodiments, the synchronization signal may be mapped to the periodic TAU timer used for power-saving mode (PSM). In a fifth embodiment, which is combinable with any of aforementioned four other embodiments, the configurable synchronization signal is transmitted in the step 304 in the target cell upon handover. In a sixth embodiment, which is combinable with any of aforementioned five other embodiments, the configurable synchronization signal is transmitted in the step 304 according to a predetermined pattern used for radio link monitoring (RLM) and mobility measurements. In a seventh embodiment, which is combinable with any of aforementioned six other embodiments, the synchronization signal is transmitted in the step 304 upon SI update, i.e. at the start or just before the BCCH modification period in which radio devices acquire the updated SI according to the step 306 subsequent to the modification period in which the radio devices are notified about the SI update.

Optionally, in any of the embodiments, the configurable synchronization signal is transmitted prior to any of the other signals (which are examples of the events), possibly with a gap in-between allowing the at least one radio device to perform post-processing, e.g., in order to properly detect the configurable synchronization signal before additional reception of the other signal according to the step 306, such as paging or PBCH, or PRACH transmission according to the step 306.

According to a UE aspect, the technique may be implemented as the method 400 of receiving, in the step 404, a configurable synchronization signal. The method 400 may further comprise at least one of the steps of receiving the synchronization signal configuration in the step 402; and attempting to detect the configurable synchronization signal in the step 404 according to the received synchronization signal configuration.

The step 402 may comprise detecting the synchronization signal configuration, in turn, comprising at least one of the sub-steps: determining when the radio device needs to be synchronized or resynchronized (i.e., the in-synchronization time); determining a necessary synchronization accumulation time occurring prior to the in-synchronization time; and determining a wake-up time from the in-synchronization time and the synchronization accumulation time. Furthermore, the radio device may use information about the synchronization signal configuration, periodicity and offset from other signals and channels to determine the wake-up time.

The step of determining when the radio device needs to be synchronized may comprise, e.g., any occurrence of when the radio device has been configured to monitor paging messages from the network, any occurrence of when the radio device has been configured to perform measurements related to, e.g., handover or other Radio Resource Management (RRM) procedures, or any occurrence of when the radio device intends to access the network, e.g., via a Random Access (RA) procedure.

The step of determining a necessary synchronization accumulation time may comprise, e.g. knowledge or estimations in the radio device about a known maximum time and/or a frequency drift since the last time the radio device was synchronized. This in turn may depend on the accuracy of a crystal oscillator that the radio device is basing its timing and frequency reference on.

The radio device may further determine a necessary synchronization accumulation time based on knowledge or estimation of the SNR at which the radio device operates. One such estimation comprises reusing a previous estimation of the SNR from the last time when the radio device was synchronized with the network and/or able to receive signals from the serving cell. If the radio device operates in a low SNR region, such as below −15 dB, the radio device may need to receive and accumulate more energy (e.g., multiple receptions 404) in order to successfully resynchronize to the cell. This may correspond to receiving several subframes of the configurable synchronization signal. If the radio device operates in a higher SNR region, such as above 0 dB, the radio device may be able to resynchronize in much shorter time, e.g. using only a few OFDM symbols.

In some implementation, the radio device may decide based on such a SNR value (e.g., equal to or greater than 0 dB) to perform resynchronization using the predefined PSS and/or SSS sequences rather than using the configurable synchronization signal, for example if the radio device determines that using the predefined synchronization signals is likely to lead to less energy consumption.

In a further embodiment, the radio device may use the information about the configurable synchronization signal being collocated with the predefined synchronization signals (e.g., PSS and/or SSS) such that the predefined synchronization signal and the configurable synchronization signal are combined in order to achieve synchronization. In that case, all three synchronization signals (PSS, SSS and configurable synchronization signal) are correlated (e.g., convoluted in the time domain) with respective synchronization sequences taking into account individual timing differences among them when combining. In that case, a radio device that failed to detect the synchronization by using the configurable synchronization signal may, by combining PSS and/or SSS sequences, still be able to achieve the synchronization without having to wait for the next configurable synchronization signal, and possibly still be able to receive any subsequent data that it planned to receive, e.g., before the next configurable synchronization signal is transmitted in the step 404.

In some embodiments, the necessary synchronization accumulation time may depend on the further operations to be performed by the radio device, e.g., in the step 406. For example, if the radio device is configured to monitor a possible paging indication from the network, and this indication is provided by a dedicated wake-up signal for this purpose, the required synchronization accuracy for detecting this wake-up signal may be different compared to, e.g., when the radio device needs to perform reception and decoding of another physical channel. Hence, the necessary synchronization accumulation time may depend on the power-saving signal configuration of such wake-up signal.

In some embodiments, the radio device may use the configurable synchronization signal to obtain time and/or frequency synchronization to a certain level of accuracy, e.g., followed by using another signal to further refine either or both of these estimates. In one such embodiment, the UE uses a PBCH signal transmitted from a base station occurring shortly after the resynchronization signal for this purpose, before continuing with further reception and transmission of signals and channels. In a further embodiment, the UE may use information about the real time clock or a local oscillator in order to estimate a timing drift that may have occurred from the last sync. Here the UE may also compensate for known drift, such that the estimated drift is minimized, thereby allowing for a minimized reception duration and minimized power consumption. The estimated drift may for example be based on an observed drift in earlier resynchronization occasions.

The invention can be applied when the UE is configured in an active mode such as RRC_CONNECTED in LTE. In some of these embodiments, the UE has been configured with a long discontinuous reception (DRX) or enhanced DRX (eDRX) cycle such that the timing and/or frequency has drifted with an amount that is longer than a threshold, where the threshold indicates a maximum drift that can be tolerated without having the need for more accurate synchronization before performing further reception or transmission actions. In time domain, this threshold may correspond to the cyclic prefix length, or a fraction thereof. In frequency domain, the threshold may correspond to for example a few tens to 100 Hz, for which reception of a control channels (such as MPDCCH), data channels (such PDSCH) or broadcast channels (such as PBCH) may be received without too much degradation.

The technique may further be applied when the radio device is configured in an inactive mode such as RRC_IDLE in an LTE implementation or a 5G implementation. Even if the radio device is mostly inactive in this state, it is expected to wake up regularly to check, e.g., paging messages and/or perform measurements (as configured by the network) in the step 406.

The technique may also be applied when the radio device is in a power saving mode (PSM), such as the one defined for 3GPP LTE. E.g., compared to DRX, the radio device is not attached to the RAN while in the PSM. The radio device needs to resynchronize to the RAN when returning from the PSM, e.g. in order to perform the random access (RA) procedure, optionally followed by a tracking area update (TAU), according to the step 406.

Figure 5:
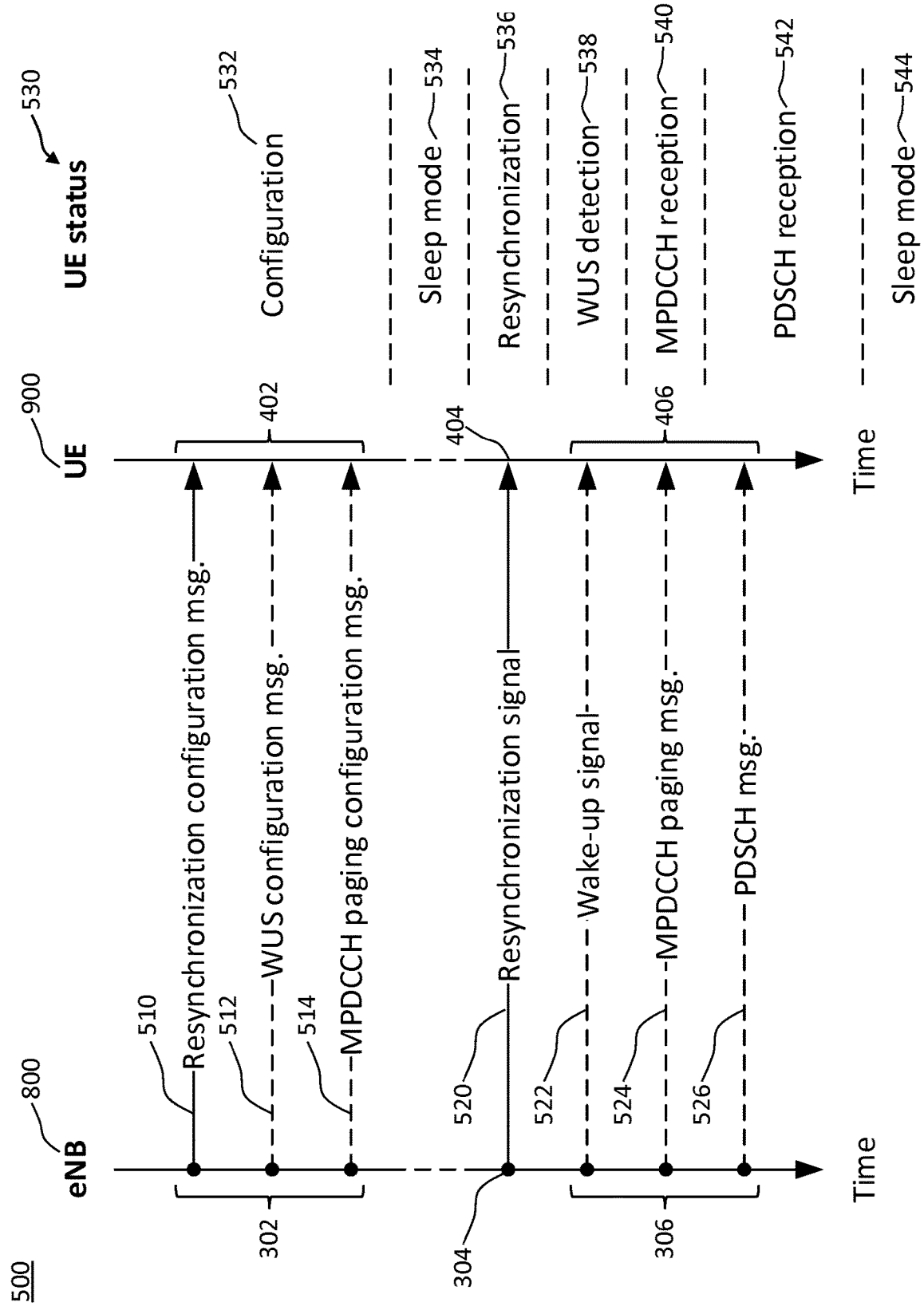
FIG. 5 shows a schematic signaling diagram resulting from embodiments of the devices of FIGS. 1 and 2 in radio communication according to the methods of FIGS. 3 and 4, respectively.

FIG. 5 shows a schematic signaling diagram 500 for the radio communication between a radio access node embodiment 800 (e.g., an eNB) of the device 100 and a radio device embodiment 900 (e.g. a UE) of the device 200. Furthermore, a status 530 of the radio device 900 is indicated at the right-hand side of FIG. 5.

Implementations of the methods 300 and 400 may comprise further steps in-between or substeps of the steps shown in FIG. 5. For example, confirmations or acknowledgments of received messages are omitted for clarity.

In a configuration stage 532, the UE 900 is being configured according to the step 402. The eNB 800 configures the UE 900 regarding the properties (e.g., any one of above-mentioned parameters) of the configurable synchronization signal by transmitting the configuration message 510 according to the step 302. In further, optional steps, the UE 900 is also configured regarding a power-saving signal (e.g., a wake-up signaling or WUS) in a power-saving signal configuration message 512 and/or a DRX configuration message 514. The DRX configuration 514 may be indicative of MPDCCH paging formats and paging configuration, including DRX cycles or eDRX cycles. In this configuration stage 532, the order of the messages may be irrelevant, since the UE 900 is not yet operating according to any of the configurations 510, 512 and 514.

At the end of a sleep mode stage 534, when the UE 900 is operating according to the above configurations 510, 512 and 514, the UE 900 wakes up from the sleep mode 534, presumably with a timing and/or frequency error sufficiently large for requiring network resynchronization. After waking up, the UE 900 attempts to detect in the step 404 the configurable synchronization signal 520 for further operations according to the step 406. In the example shown in FIG. 5, the UE 900 is attempting to detect a power-saving signal 522, e.g., a wake-up signal (WUS). The wake-up signal 522 in this sense may comprise a signal that is only transmitted when the UE 900 needs to perform further actions in the step 406. Alternatively or in addition, the power-saving signal 522 may be a periodically transmitted signal functioning as either a wake-up signal or a go-to sleep signal in each instance depending on whether or not data 524 or 526 is available at the eNB 800. That is, the power-saving signal 522 differs in its information content. Other possibilities are to directly try to detect the control data 524, e.g., a MPDCCH paging, e.g., in case WUS is not configured, i.e., the power-saving signal 522 is deactivated according to the power-saving signal configuration 512. If the power-saving signal 522 (e.g., the WUS 522 in the stage 538) and/or the control data 526 (e.g., a scheduling assignment or paging message on the MPDCCH in the stage 540) indicates that the UE 900 receives user data 526, the UE 900 further receives the assigned radio resources, e.g., a PDSCH message carrying the user data 526 in the stage 542 (which may include the actual paging message) and/or any further actions according to the communication step 406. Having finished all communication activities in the step 406, the UE 900 falls back into the sleep mode 544 in order to preserve power, until its next activity.

The example described in FIG. 5 relates to the paging mechanism, but corresponding signaling diagrams may be derived for any of the other scenarios described herein. For example, if the communication actions in the step 406 following the resynchronization in the step 404 aims at receiving other signals, e.g., system information acquisition (i.e., MIB and/or one or more SIBs), the UE 900 receives on the PBCH and/or MPDCCH/PDSCH.

For NB-IoT, a specific NB-IoT PSS (NPSS) and/or a specific NB-IoT SSS (NSSS) is transmitted on an anchor carrier, e.g., according to 3GPP Release 13. Moreover, in one alternative embodiment of the above, the synchronization signal configuration 510 contains information about which carrier, optionally including non-anchor carriers, the configurable synchronization signal is to be received on in the step 404.

The subframes used for the configurable synchronization signal 520 may be indicated as invalid downlink (DL) subframes in a bitmap containing this information such that Rel-13 and Rel-14 eMTC UEs 900 may not consider these subframes as valid DL subframes for other purposes than the configurable synchronization signal 520. However, it is also possible that the eNB 800 coordinates different transmissions in different frequency regions via scheduling or configuration such that no Rel-13 or Rel-14 eMTC UE 900 intends to use the particular time and frequency resources occupied by the configurable synchronization signal 520 for other purposes.

The configurable synchronization signal 520 according to the technique is preferably intended to be used for re-synchronization and not for initial synchronization. For example, at initial acquisition, a UE 900 would not know if or how it is configured or even supported in a cell of the eNB 800. Furthermore, some embodiments of the technique apply a fixed (e.g., UE-specific) synchronization signal configuration 510 (e.g., mapped to PBCH transmission as of above) is either hard-coded according to a specification or used in the entire network. In this case, the step 302 may be omitted.

While embodiments have been described herein from a system aspect, a base station aspect and/or a radio device aspect, the skilled person appreciates that the embodiments will have counterparts in the other aspects, i.e., correspond features and/or corresponding steps, which are part of the present disclosure. E.g., signals disclosed as transmitted by the radio access node 800 (e.g., a network node) in a certain fashion have a counterpart in the radio device 900 (e.g., a UE) receiving the same type of signal, and vice versa.

Moreover, the power-saving signal 514 may be selectively transmitted in the step 406 depending on the DRX configuration 514 and/or the power-saving signal configuration 512. The DRX configuration 514 and/or the power-saving signal configuration 512 may specify that the power-saving signal be used (e.g., that the WUS or the GTS be used) subject to the availability of data 524 and/or 526, or that the power-saving signal 522 be not used (even if there is data 524 and/or 526). In other words, the DRX configuration 514 and/or the power-saving signal configuration 512 may specify whether or not reception of the power-saving signal 522 is to be expected by the radio device 900, which implies a corresponding operation of the receiver at the radio device 900. Alternatively or in addition, the DRX configuration 514 or the power-saving signal configuration 512 may specify the power-saving signal, e.g., as to a length in the time domain, a number of repetitions, a bandwidth in the frequency domain and a transmit power of the power saving signal.

The receiver may be enabled at the radio device 900, if the DRX configuration 514 or the power-saving signal configuration 512 specifies that the power-saving signal 522 be used. Enabling the receiver (e.g., a receiving unit and/or a decoding unit) may comprise supplying electrical power to the receiver. The receiver may be disabled prior to the step of selectively enabling the receiver.

The time and/or energy consumed for receiving the power-saving signal 522 may be less than (e.g., a fraction of) the time and/or energy necessary for receiving the data 524 or 526. Disabling the receiver (e.g., the receiver unit) may comprise interrupting supply of electrical power to (e.g., at least some parts of) the receiver.

The method 400 may further comprise a step of directly receiving from the radio access node 800 (e.g., on a radio resource according to the DRX configuration 514) the control data 524 and/or user data 526, if the power-saving signal configuration 512 specifies that the power-saving signal be not used.

Figure 6:
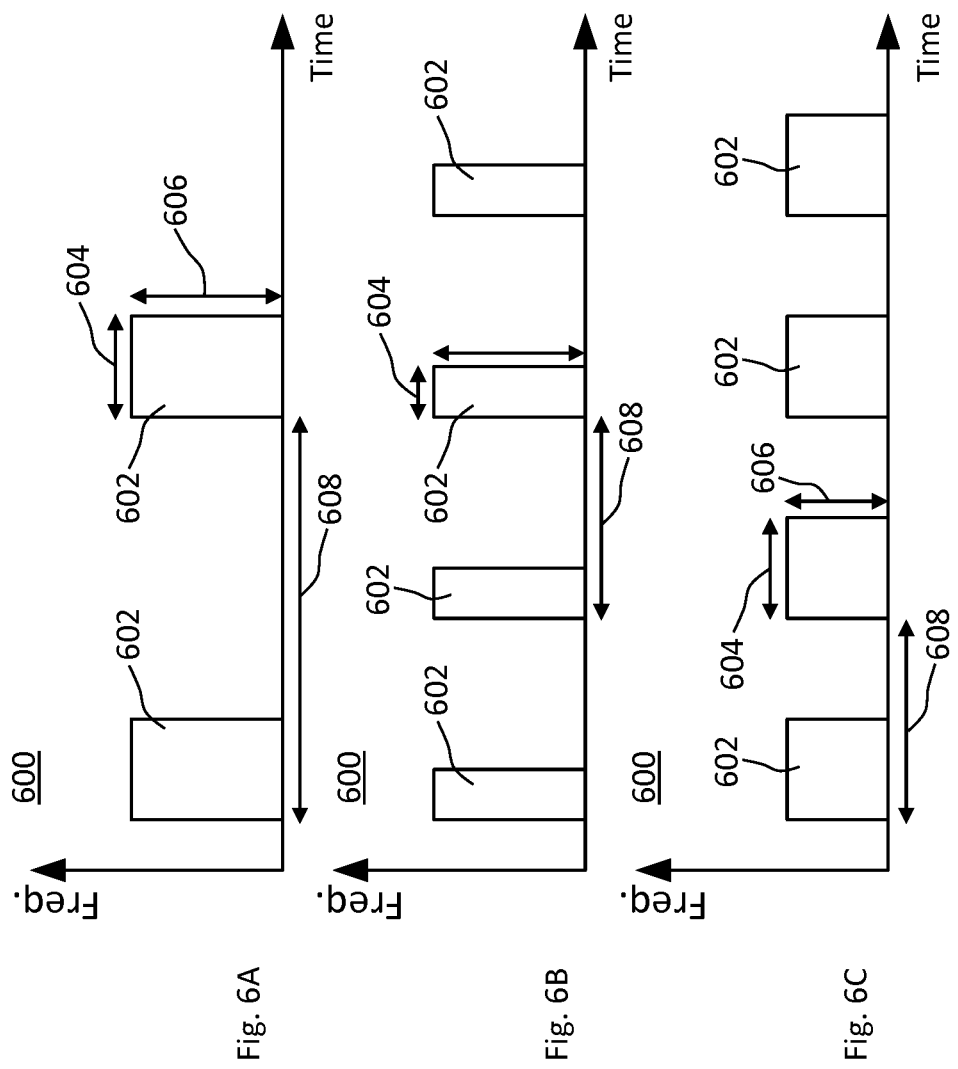
FIGS. 6A, 6B and 6C schematically illustrates parameters of a synchronization signal configurations, which are applicable to embodiments of the devices of FIGS. 1 and 2 or implementations of the methods of FIGS. 3 and 4.

FIGS. 6A, 6B and 6C schematically illustrate, in a time-frequency grid, examples of the synchronization signal configuration 600, e.g., parameters of the transmission pattern, optionally including the coding pattern. Reference sign 602 indicates radio resources for transmission occasions for transmitting the configurable synchronization signal 520 in each case.

The synchronization signal configuration 600 in the configuration message 510 for the configurable synchronization signal 520 may define the transmission pattern, optionally including the coding pattern. The synchronization signal configuration 600 may further depend on the configuration of other physical signals or channels. One such signal may for example be a wake-up signal 522, intended to be used by the network to indicate that one or more UEs 900 are being paged. In some embodiments, one or more of the above-mentioned configuration parameters of the configurable synchronization signal 520 may be related to one or more configuration parameters of such a wake-up signal 522. For example, the DRX cycle length (e.g., a paging period) may define the periodicity 608 in the synchronization signal configuration 600. A further optional parameter of the synchronization signal configuration 600 is a timing offset. A configured timing offset may correspond to a shift in time of the transmission pattern 602 compared to a nominal timing. Alternatively or additionally, the synchronization signal configuration 600 may depend on the maximum number of repetitions configured in the network for different signals or physical channels, e.g., the MPDCCH or PDSCH.

A base station profile (e.g., stored at the radio access node 800) may determine the synchronization signal configuration 600 of the configurable synchronization signal 520, e.g., as schematically illustrated in FIGS. 6A, 6B and 6C. This profile may depend on, e.g., a desired cell coverage (e.g., in terms of the MCL level) and/or a requirement for maximal latency (e.g., related to the QoS requirement) such that more radio resources 602 are allocated for the transmission 304 of the configurable synchronization signal 520. E.g., a longer signal in the time domain, i.e., a greater length 604 as one of the configuration parameters, may be set in a cell requiring a higher coupling loss, as schematically illustrated in FIG. 6A.

Another property (e.g., radio condition or capability) that may affect the synchronization signal configuration 600 is the paging periodicity 608 of UEs 900 in the cell. UEs 900 with a higher paging period 608, which can imply or experience a greater timing deviation, may benefit from more frequently transmitted configurable synchronization signals 510 on corresponding resources 602, as schematically illustrated in FIG. 6B.

Both properties described with reference to the FIGS. 6A and 6B are combinable, e.g., at the expense of a higher network overhead, which is schematically illustrated in FIG. 6C. It is also possible to vary the resource allocation in the frequency domain, such that a smaller or larger part of the spectrum is covered by the radio resource 602 for the configurable synchronization signal 520 according to the bandwidth 606 as a configuration parameter. Hence, a network may decide to target one or the other or both of the above properties, e.g., with a corresponding varying synchronization signal configuration 600. The combination of the configuration parameters allows the network to control the network overhead.

Figure 7:
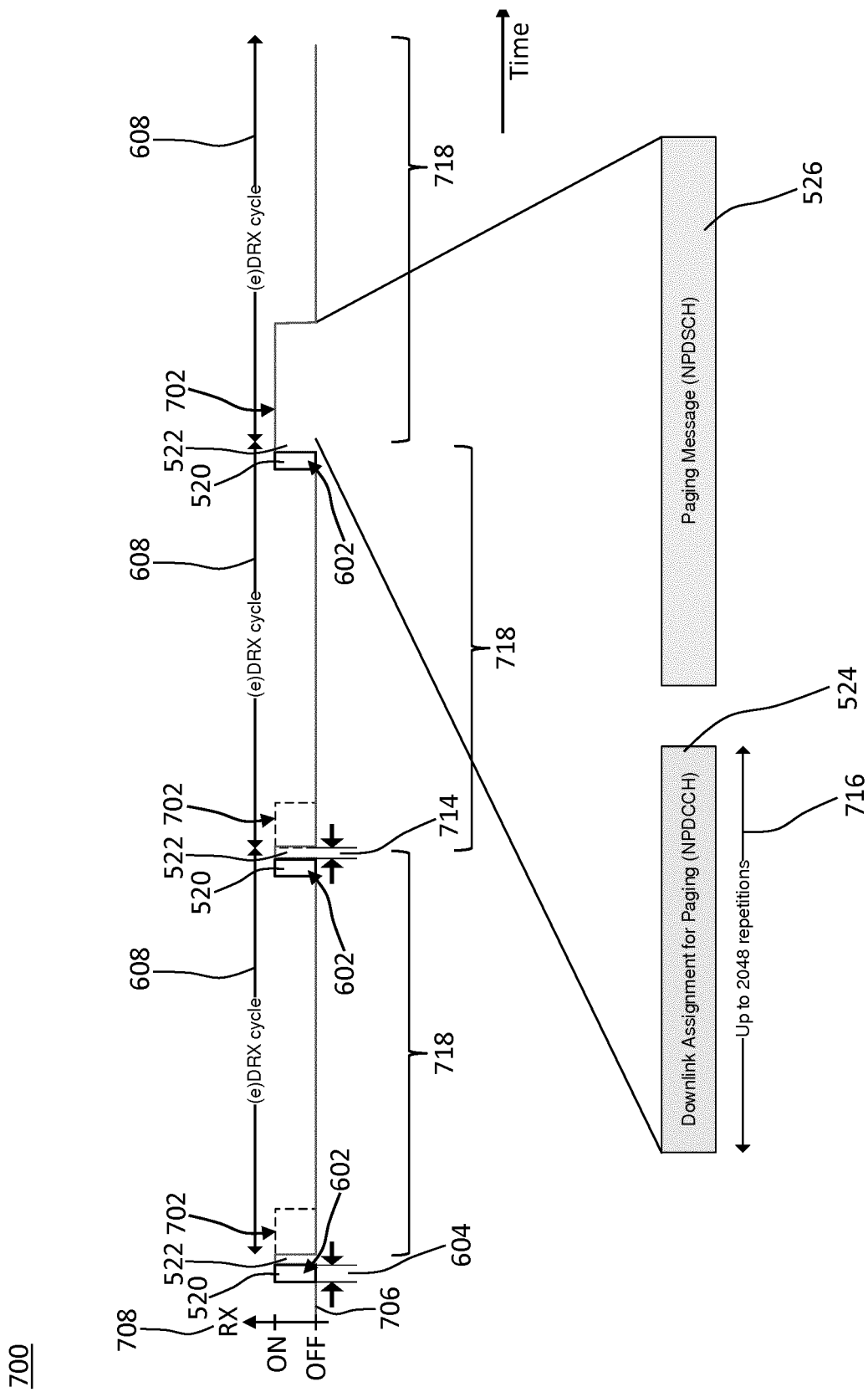
FIG. 7 schematically illustrates further parameters of a configuration, which is applicable to embodiments of the devices of FIGS. 1 and 2 or implementations of the methods of FIGS. 3 and 4.

FIG. 7 schematically illustrates further parameters of the synchronization signal configuration 600 and/or a DRX configuration 700 carried in the DRX control message 514. As schematically illustrated in FIG. 7, for the use of faster synchronization before paging occasions (PO) 702, i.e. for DRX or eDRX in RRC_IDLE mode, in one embodiment the radio access node 800 (e.g., the BS) may broadcast the configurable synchronization signal 520 in the corresponding radio resources 602 with a time offset prior to each subframe used for the paging in the cell. I.e., not only the subset used by a certain UE 900 receives in the step 404 the configurable synchronization signal 520, since it is not known to the BS 800 which of the UEs camp on the cell.

In some embodiments, the synchronization signal configuration 600 of the configurable synchronization signal 520 enables the UE 900 to achieve combining gains by receiving both the predefined synchronization signals (which may also be referred to as regular synchronization signals, e.g., PSS and/or SSS) and the configurable synchronization signal 520. As an example, for a Cat-M1 UE 900, this combining can be facilitated by mapping the configurable synchronization signal 520 to the same 72-subcarrier region 602 in the center of the LTE system bandwidth also used for the regular LTE PSSs and LTE SSSs.

The radio resources 702 are transmission opportunities according to the DRX configuration 700. Depending on the power-saving signal configuration 512 (optionally as part of the DRX configuration message 514), the power-saving signal 522 is selectively transmitted to preemptively inform the radio device 900 of whether or not the next transmission opportunity 702 is used, i.e., whether or not there will be a transmission of control data 524 or user data 526 for the radio device 900 on the next radio resource 702 according to the DRX configuration 514.

For the configuration 700 illustrated in FIG. 7, the power-saving signal configuration is activated, i.e., the power-saving signal 522 can be transmitted according to the selective transmission at the radio access node 800, and the receiver is enabled according to the selective enablement for reception of the power-saving signal 522 at the radio device 900. A status 706 of a power supply 708 of the receiver at the radio device 900 is illustrated as a function of time (increasing from left to right) in FIG. 7.

If the power-saving signal configuration as part of the DRX configuration 500 is activated, the power-saving signal 522 can be transmitted by the radio access node 800 and can be received by the radio device 900 in the steps 306 and 406, respectively. In a first implementation compatible with any embodiment, the power saving signal 522 is transmitted ahead of each transmission opportunity 702 and indicates whether or not there is data for transmission in the next transmission opportunity 702. In a second implementation compatible with any embodiment, the power saving signal 522 is transmitted ahead of the next transmission opportunity 702 only if there is data 524 or 526 to be transmitted in this transmission opportunity 702. The power-saving signal 522 according to the second implementation is also referred to as WUS.

The indication of the availability of data for transmission in the power-saving signal 522 according to the first implementation, or the presence of the WUS 522 indicating the availability of data for transmission according to the second implementation, causes the radio device 900 to enable its receiver in the step 406 for data reception on the radio resource 702 according to the DRX configuration message 512, i.e., in the transmission opportunity 702. The radio device 900 may maintain its receiver enabled for reception in the step 406 after enabling the receiver in the step 402 or 404. Alternatively, the radio device may disable the receiver after the step 402 or 404 for signal reception and re-enable the receiver for data reception in the step 406, e.g., if there is a gap between the radio resource 602 and the radio resource for the power-saving signal 522, or between the radio resource for the power-saving signal 522 and the radio resource 702 according to the DRX configuration, i.e., the transmission opportunity 702.

If DRX is activated and the signal configuration as part of the DRX configuration is deactivated, the radio access node 800 does not transmit the power-saving signal 522 in the step 306, irrespective of whether or not there is data 524 or 526 to be transmitted. According to such a DRX configuration, the radio device 900 does not expect a power-saving signal 522 and does not enable (i.e., provides no power to) its receiver in the step 406 at the resource of a signal 522. Rather, the radio device 900 enables (i.e., provides power to) its receiver for decoding, e.g., downlink control information 524, at each transmission opportunity 702.

Herein, the data may comprise user data 524 and/or control data 526. For example, the transmission opportunity 702 may comprise downlink control information (DCI) 524 as control data. If the DCI 524 is indicative of a scheduling assignment, the radio device 900 may continue to receive the user data 526 according to the scheduling assignment 524.

The power-saving signal configuration 512 may further specify a signal length 714 of the power-saving signal 522. The signal length 714 may be cell-specific, e.g., according to a coverage range of the node defined in terms of the MCL. Alternatively or in addition, the signal length 714 may be device-specific, e.g., according to a coverage enhancement level associated with the radio device. Moreover, a range may be related to a DCI length 716 of the DCI 524 in the radio resource 702 according the DRX configuration 514, i.e., the transmission opportunity 702.

For example, the signal length 714 of the WUS 522 may be at most half or 10% of the DCI length 716. The signal length 714 and/or the DCI length 716 may be controlled by defining a number of repetitions for the power-saving signal 522 and/or the DCI 524, respectively. For example, the number of repetitions for the power saving signal 522 may be equal to the number of repetitions for the DCI 524.

In the example for the DRX configuration illustrated in FIG. 7, the DRX configuration 700 defines DRX cycles 718 with a DRX cycle length matched to the periodicity 608 of the synchronization signal configuration 600. That is, the radio resources 702 are periodic with the periodicity 608. In the first and second cycles 718 shown in FIG. 7, the power-saving signal 522 is indicative of an unavailability of data 524 and 526 (according to the first implementation) or the WUS 522 is absent (according to the second implementation). Hence, the radio device 900 wakes up (i.e. supplies power to its receiver) for receiving the power-saving signal 522 and skips the reception in transmission opportunity 702 according to the step 406, since there is no transmission according to the step 306.

In one embodiment, the technique is applicable to an idle mode operation of the radio device 900 for monitoring paging based on the power-saving signal 522. The data 524 or 526 comprises a paging message. When the power-saving signal 522 is activated according to the power-signal configuration 512, in every paging cycle 518, the radio device 900 wakes up (at the latest in the step 406) before its designated time window 702 (i.e., the transmission opportunity 702 according to the DRX configuration 700) to check in the step 406 whether there is DCI 524 for a paging message.

The paging cycle 718 may be configured as DRX cycle or eDRX cycle. For NB-IoT, the maximum DRX and eDRX cycles are 10.24 seconds and two hours, 54 minutes and 46 seconds, respectively. Corresponding maximum numbers for eMTC is 2.56 seconds for DRX and 43 minutes for eDRX. In a NB-IoT implementation, the paging message 526 is carried in NPDSCH and scheduled by DCI format N2 carried in NPDCCH 524. In an eMTC implementation, the paging message 526 is carried in MPDSCH and scheduled by DCI format 6-2 carried in MPDCCH 524.

For radio devices (e.g., UEs) in extreme coverage limited situations, up to 2048 repetitions 716 may be used for transmitting the DCI 524. Thus, a radio device 900 may need to receive as many as 2048 subframes to determine whether there is a paging message 526 sent on the associated NPDSCH (e.g., starting 4 NB-IoT subframes from the end of last subframe of the NPDCCH 524). In an eMTC implementation, the MPDSCH may start 2 subframes from the end of the last subframe of the MPDCCH 524. By way of example, in most DRX or eDRX cycles 718, however, no scheduling assignment (e.g., no DCI format N2) is sent at all during one DRX or eDRX cycle 718. Thus, from a power efficiency point of view, the radio device may stay awake in many cases for an unnecessarily long time attempting to decode the control data (e.g., the scheduling assignment, particularly a DCI format N2). Such waste of energy can be avoided by changing the power-signal configuration by transmitting the corresponding control message 512.

Figure 8:
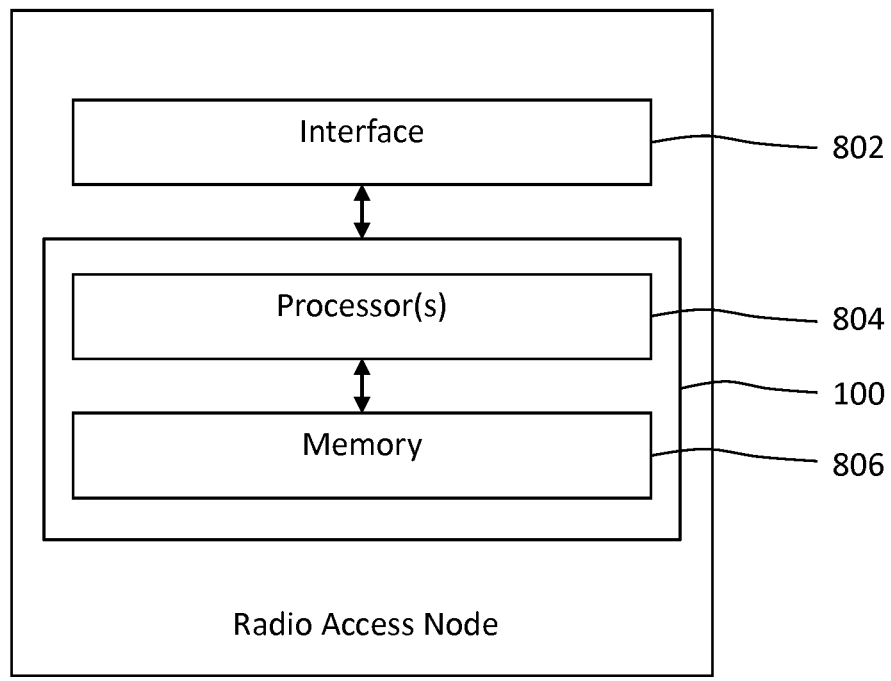
FIG. 8 shows a schematic block diagram of an embodiment of the device of FIG. 1.

FIG. 8 shows a schematic block diagram for an embodiment of the device 100. The device 100 comprises one or more processors 804 for performing the method 300 and memory 806 coupled to the processors 804. For example, the memory 806 may be encoded with instructions that implement at least one of the modules 102, 104 and 106.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100 (such as the memory 806), scheduler functionality, data transmitter functionality or RAN functionality. For example, the one or more processors 804 may execute instructions stored in the memory 806. Such functionality may include providing various features and steps discussed herein, including any of the benefits disclosed herein. The expression "the device being operative to perform an action" may denote the device 100 being configured to perform the action.

As schematically illustrated in FIG. 8, the device 100 may be embodied by a node 800, e.g., of the RAN. The node 800 comprises a radio interface 802 coupled to the device 100 for radio communication with one or more radio devices.

In a variant, the functionality of the device 100 is, e.g., partly or completely, provided by another node of the RAN or another node of a core network linked to the RAN. That is, the other node performs the method 300. The functionality of the device 100 is provided by the other node to the node 800, e.g., via the interface 802 or a dedicated wired or wireless interface.

Figure 9:
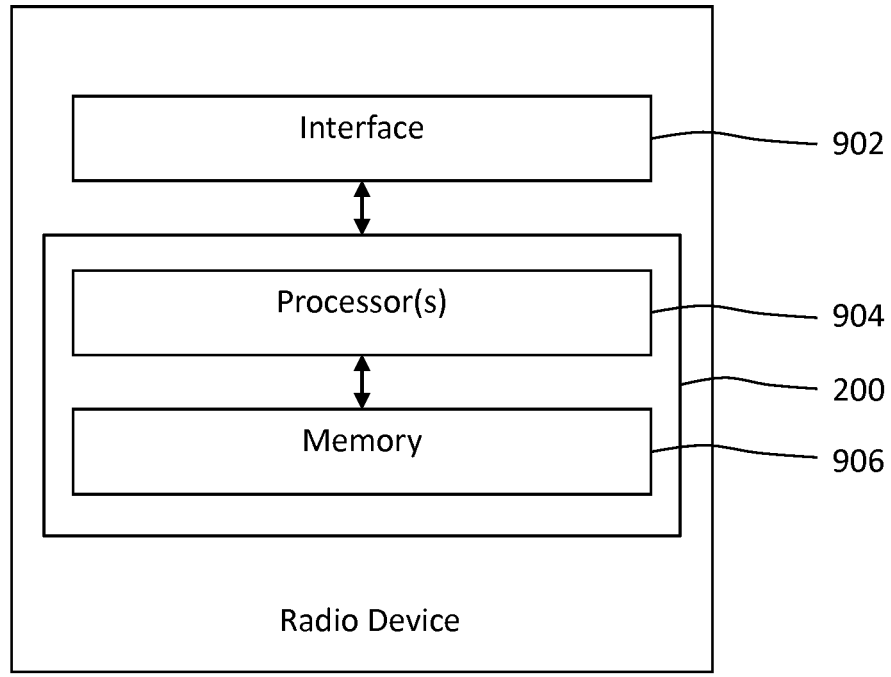
FIG. 9 shows a schematic block diagram of an embodiment of the device of FIG. 2.

FIG. 9 shows a schematic block diagram for an embodiment of the device 200. The device 200 comprises one or more processors 904 for performing the method 400 and memory 906 coupled to the processors 904. For example, the memory 906 may be encoded with instructions that implement at least one of the modules 202, 204 and 206.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100 (such as the memory 906), data receiver functionality or radio device functionality. For example, the one or more processors 904 may execute instructions stored in the memory 906. Such functionality may include providing various features and steps discussed herein, including any of the benefits disclosed herein. The expression "the device being operative to perform an action" may denote the device 200 being configured to perform the action.

The node 900 comprises a radio interface 902 coupled to the device 200 for radio communication with at least one of an embodiment of another radio device and an embodiment of the radio access node.

Figure 10:
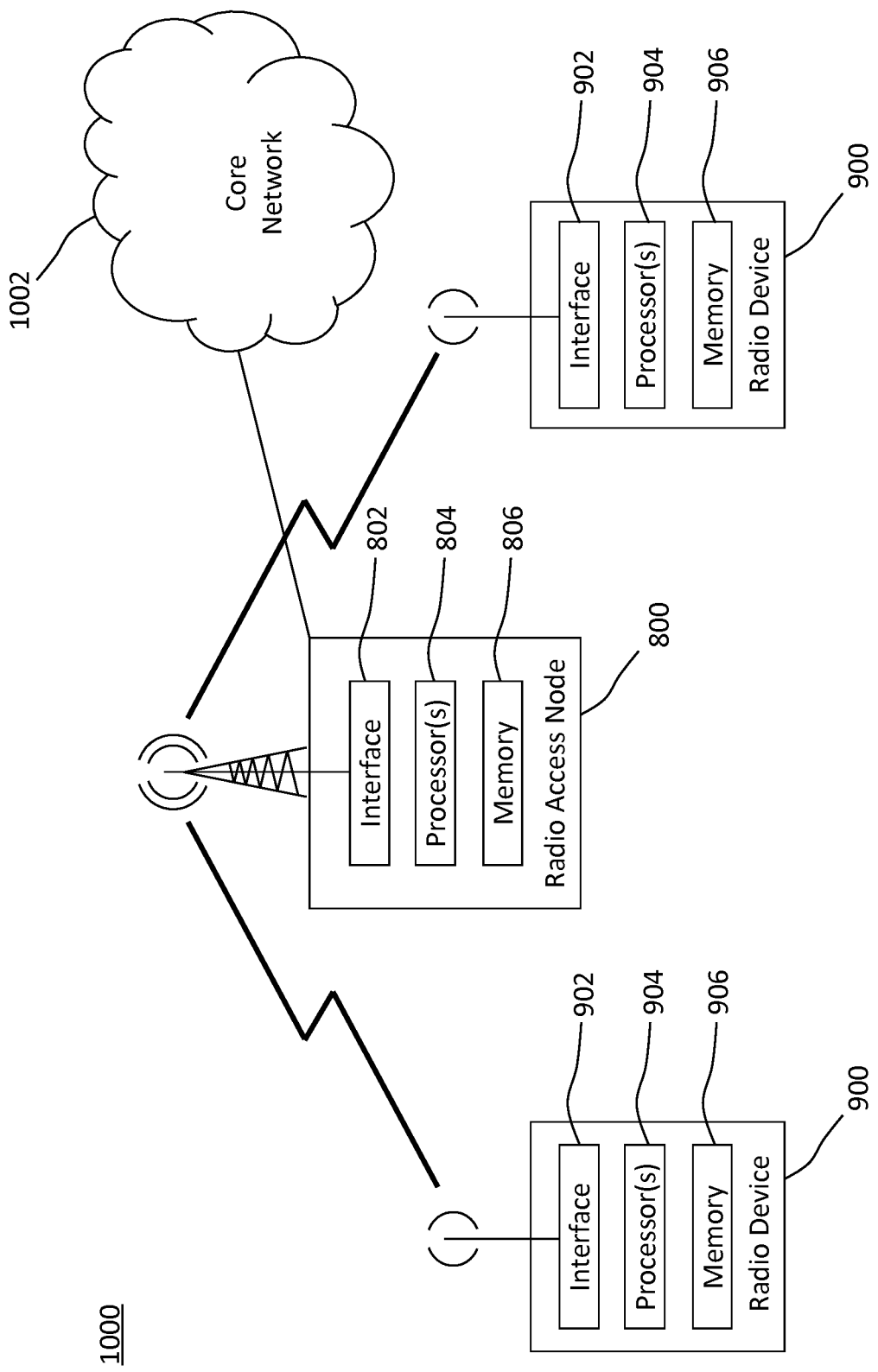
FIG. 10 shows a schematic block diagram of a network comprising embodiments of the devices of FIGS. 1 and 2.

An embodiment of a network 1000 is schematically illustrated in FIG. 10. The network 100 comprises a RAN. The RAN comprises at least one cell served by an embodiment of the radio access node 800. One or more embodiments of the radio device 900 are located within a coverage range of the cell.

The radio access node 800 may be coupled to a core network 1002 of the network 1000.

Time and frequency synchronization contributes to a significant part of the total system acquisition time. This holds both for initial cell search and system acquisition, as well as for resynchronization scenarios. While other components, e.g. MIB, SIB1-BR, and SI message acquisition, can be addressed with improved receiver algorithms and reduced requirements on system information reading, the basic time and frequency synchronization needs to be done regularly, for example to be able to monitor paging, perform RRM measurements, or perform random access procedures.

Whether or not the synchronization performance using the present mechanisms is sufficient may depend on assumptions and targeted scenarios. E.g., the maximum supported MCL may differ largely between different cells, deployments, supported IoT applications, etc. Consequently, it may be difficult to define a fixed enhanced synchronization signal that provides enough synchronization performance in all types of scenarios without having to specify a very large one, thereby increasing the system overhead in an undesired fashion. The solution then is to define an optional enhanced synchronization signal that can be configured according to the current needs of an individual cell. Some desired basic properties of such a signal can be outlined:

An enhanced sync signal shall be configurable per cell, including the possibility to switch it off.

The amount of physical resources used shall be configurable.

It is hence beneficial if an enhanced synchronization signal is optional for the network, and furthermore configurable per cell with respect to at least the physical resource allocation.

In typical resynchronization scenarios, the timing uncertainty will be much smaller. Thus, it is much more efficient if the resynchronization signal is concentrated in time such that, e.g., in targeted scenarios, one RSS transmission burst is enough to achieve time and frequency synchronization. It is herein proposed that this burst duration is configurable per cell in order to adjust to different network deployments, MCL targets etc. It is also desirable to have the periodicity of the RSS bursts configurable, both to have control of the system overhead, and to cater for different needs, as will be discussed more below. Hence, in order to have control of the system overhead, and to adjust to different needs, a resynchronization signal (RSS) should be configurable both with respect to periodicity of the signal and the amount of time/frequency resources used at each transmission occasion.

An RSS may be configurable in time domain. The frequency location may also be configurable, or may be determined by a standard. For example, it could be beneficial to locate an RSS in the center 6 PRBs, thereby opening up for utilizing also the legacy, known PSS/SSS and potentially also the presumably known PBCH to achieve sync faster. However, since the center PRBs are fairly occupied already, it may be better to place the RSS elsewhere. This may be in particular for TDD systems or systems where the MBSFN subframes are occupied (e.g. by eMBMS transmission).

In a resynchronization scenario, it is typically assumed that the sync signal to find is known to the UE, e.g. given by the Cell ID which determines the sequence(s) used for PSS and SSS. However, it is also possible that some additional information is conveyed by the resynchronization signal. One example of useful information to convey, in addition to the cell identity, may for example be to indicate that the MIB or other system information has changed. This can then further be used by the UE to determine whether some or all MIB and/or SIB reading can be skipped. Similarly, information regarding Extended Access Barring may be conveyed.

Hence, in addition to a cell identity, the resynchronization signal can be used convey additional information, such as indication that the MIB or some other system information has changed, or access barring information. Since the resynchronization signal is not decoded like in "normal" data transfer, the information would need to be included in the selection or combination of sequences. In this respect, already the sequence selection of the PSS/SSS is a way of encoding the cell identity. Further information transfer may then be realized e.g. by increasing the signal space used by the RSS, or by reducing the space used to represent the Cell ID and have part of that representing the conveyed additional information instead. It is possible also to convey information by encoding it in terms of using different combinations of sub-sequences in each transmission burst.

As has become apparent from above description, embodiments of the technique enable radio devices to reattach to the network at a considerably lower cost compared to existing techniques. A configurable synchronization signal may be confined into adjacent RBs. Furthermore, the configurability of the configurable synchronization signal allows the network to adjust the need and/or cost for providing the synchronization to its own situation. A network aiming to support radio devices with extremely low SNR may opt to transmit a more robust configurable synchronization signal, but maybe less often, whereas networks supporting radio device with moderate SNR may transmit a less robust synchronization signal more often. The overhead (e.g., in terms of signaling radio resources) in these two cases can be the same but the networks can operate quite differently and be targeting different use cases.

Many advantages of the present disclosure will be fully understood from the foregoing description, and it will be apparent that various changes may be made in the form, construction and arrangement of the units and devices without departing from the scope of the disclosure and/or without sacrificing all of its advantages. Since the disclosure can be varied in many ways, it will be recognized that the invention encompasses the scope of the following claims.

The invention claimed is:

1. A method of providing synchronization with a radio access node for radio communication to one or more radio devices, the method comprising:
    transmitting a configuration message to at least one of the radio devices, the configuration message being indicative of a synchronization signal configuration for a configurable synchronization signal; wherein the configuration message is indicative of:
        a periodicity of transmission occasions of the configurable synchronization signal;
        a number of repetitions used in each transmission occasion of the configurable synchronization signal;
        a timing offset for each transmission occasion of the configurable synchronization signal; and
        a frequency location of the configurable synchronization signal in the frequency domain; and
    transmitting the configurable synchronization signal to the at least one radio device in accordance with the synchronization signal configuration, wherein the configurable synchronization signal is indicative of a change in system information and comprises one or more bits indicating whether the system information has been changed during the last X time units, wherein X is preset in a standardization document.

2. The method of claim 1, further comprising communicating one or more decodable signals between the radio access node and the at least one radio device using radio resources in accordance with the configurable synchronization signal.

3. The method of claim 2, wherein the communicating includes broadcasting the one or more decodable signals comprising system information.

4. The method of claim 2, wherein the one or more decodable signals comprises a wake-up signal (WUS) and/or a paging message from the radio access node.

5. The method of claim 1, wherein the configuration message, the synchronization signal configuration, and/or the configurable synchronization signal is cell-specific.

6. The method of claim 1, wherein the configurable synchronization signal provides or supports a timing synchronization and/or a frequency synchronization.

7. The method of claim 1, wherein repetitions of the configurable synchronization signal are arranged according to an aperiodic coding pattern.

8. The method of claim 1, wherein the change in system information is provided by altering a sequence index of the configurable synchronization signal.

9. The method of claim 1, wherein the configuration message is further indicative of:
- a length of the configurable synchronization signal in the time domain;
- a gap between the repetitions; and/or
- a bandwidth of the configurable synchronization signal in the frequency domain.

10. The method of claim 1, wherein the configurable synchronization signal is transmitted in addition to primary synchronization signals and/or secondary synchronizing signals transmitted by the radio access node.

11. A method of synchronizing a radio device with a radio access node for radio communication, the method comprising the radio device:
- receiving a configuration message from the radio access node, the configuration message being indicative of a synchronization signal configuration for a configurable synchronization signal; wherein the configuration message is indicative of:
  - a periodicity of transmission occasions of the configurable synchronization signal;
  - a number of repetitions used in each transmission occasion of the configurable synchronization signal;
  - a timing offset for each transmission occasion of the configurable synchronization signal; and
  - a frequency location of the configurable synchronization signal in the frequency domain; and
- receiving the configurable synchronization signal from the radio access node in accordance with the synchronization signal configuration, wherein the configurable synchronization signal is indicative of a change in system information and comprises one or more bits indicating whether the system information has been changed during the last X time units, wherein X is preset in a standardization document.

12. The method of claim 11, further comprising communicating one or more decodable signals between the radio access node and the radio device using radio resources in accordance with the configurable synchronization signal.

13. The method of claim 12, wherein the communicating includes receiving the one or more decodable signals comprising system information.

14. The method of claim 13, wherein the radio device only reads the system information in response to the configurable synchronization signal being indicative of a change in system information.

15. The method of claim 12, wherein the one or more decodable signals comprises a wake-up signal (WUS) and/or a paging message from the radio access node.

16. The method of claim 11, wherein the configurable synchronization signal provides or supports a timing synchronization and/or a frequency synchronization.

17. The method of claim 11, wherein repetitions of the configurable synchronization signal are arranged according to an aperiodic coding pattern.

18. The method of claim 11, wherein the change in system information is provided by altering a sequence index of the configurable synchronization signal.

19. The method of claim 11, wherein an initial access of the radio device is based on primary synchronization signals and/or secondary synchronizing signals and a re-synchronization of the radio device is based on the configurable synchronization signal.

20. A device for providing synchronization with a radio access node for radio communication to one or more radio devices, the device comprising:
- processing circuitry;
- memory containing instructions executable by the processing circuitry whereby the device is operative to:
  - transmit a configuration message to at least one of the radio devices, the configuration message being indicative of a synchronization signal configuration for a configurable synchronization signal; wherein the configuration message is indicative of:
    - a periodicity of transmission occasions of the configurable synchronization signal;
    - a number of repetitions used in each transmission occasion of the configurable synchronization signal;
    - a timing offset for each transmission occasion of the configurable synchronization signal; and
    - a frequency location of the configurable synchronization signal in the frequency domain; and
  - transmit the configurable synchronization signal to the at least one radio device in accordance with the synchronization signal configuration, wherein the configurable synchronization signal is indicative of a change in system information and comprises one or more bits indicating whether the system information has been changed during the last X time units, wherein X is preset in a standardization document.

21. A device for synchronizing a radio device with a radio access node for radio communication, the device comprising:
- processing circuitry;
- memory containing instructions executable by the processing circuitry whereby the device is operative to:
  - receive a configuration message from the radio access node, the configuration message being indicative of a synchronization signal configuration for a configurable synchronization signal; wherein the configuration message is indicative of:
    - a periodicity of transmission occasions of the configurable synchronization signal;
    - a number of repetitions used in each transmission occasion of the configurable synchronization signal;
    - a timing offset for each transmission occasion of the configurable synchronization signal; and
    - a frequency location of the configurable synchronization signal in the frequency domain; and
  - receive the configurable synchronization signal from the radio access node in accordance with the synchronization signal configuration, wherein the configurable synchronization signal is indicative of a change in system information and comprises one or more bits indicating whether the system information has been changed during the last X time units, wherein X is preset in a standardization document.

* * * * *